United States Patent
Satou et al.

(10) Patent No.: US 11,574,006 B2
(45) Date of Patent: Feb. 7, 2023

(54) COMMUNICATION DEVICE, COMMUNICATION SYSTEM, AND CONTENT COLLECTION METHOD

(71) Applicant: PANASONIC CORPORATION, Osaka (JP)

(72) Inventors: Tetsurou Satou, Kanagawa (JP); Mitsuru Uesugi, Kanagawa (JP)

(73) Assignee: PANASONIC HOLDINGS CORPORATION, Osaka (JP)

( * ) Notice: Subject to any disclaimer, the term of this patent is extended or adjusted under 35 U.S.C. 154(b) by 622 days.

(21) Appl. No.: 16/498,921

(22) PCT Filed: Nov. 1, 2017

(86) PCT No.: PCT/JP2017/039533
§ 371 (c)(1),
(2) Date: Sep. 27, 2019

(87) PCT Pub. No.: WO2018/179558
PCT Pub. Date: Oct. 4, 2018

(65) Prior Publication Data
US 2020/0050627 A1 Feb. 13, 2020

(30) Foreign Application Priority Data

Mar. 29, 2017 (JP) .............................. JP2017-064275

(51) Int. Cl.
*G06F 16/00* (2019.01)
*G06F 16/587* (2019.01)
(Continued)

(52) U.S. Cl.
CPC .......... *G06F 16/587* (2019.01); *G06F 16/535* (2019.01); *G06F 16/55* (2019.01);
(Continued)

(58) Field of Classification Search
None
See application file for complete search history.

(56) References Cited

U.S. PATENT DOCUMENTS

| | | | |
|---|---|---|---|
| 2008/0046708 A1* | 2/2008 | Fitzgerald | G06F 8/64 713/2 |
| 2011/0158558 A1* | 6/2011 | Zhao | G06F 16/5838 382/305 |

(Continued)

FOREIGN PATENT DOCUMENTS

| | | |
|---|---|---|
| JP | 2014-063401 A5 | 4/2014 |
| JP | 2015-212935 A | 11/2015 |

(Continued)

OTHER PUBLICATIONS

ISR issued in PCT/JP2017/039533, dated Dec. 26, 2017.
Extended European Search Report dated Sep. 1, 2020 issued in European Patent Application No. 17903329.5.
Akihiro Nakao, 5GMF/The University of Tokyo, Japan, "Draft Recommendation: High level technical characteristics of network softwarization for IMT-2020; TD126 (WP 1/13)", dated Feb. 14, 2017, ITI-T Draft; Study Period 2017-2020; Study Group 13; Series TD126 (WP 1/13), International Telecommunication Union, Geneva; CH, vol. 6/13,20/13,21/13,22/13,23/13 pp. 1-61, XP044209404.

*Primary Examiner* — Tuankhanh D Phan
(74) *Attorney, Agent, or Firm* — Greenblum & Bernstein, P.L.C.

(57) ABSTRACT

In order to enable a user to acquire a desired content more quickly by performing a matching process by using search target ID information identifying a search target so as to properly acquire a content regarding the search target and to shorten a time required to complete the matching process, a communication device such as router is configured such that, when receiving an interest form a content-centric network, the communication device performs a search process on contents accumulated therein, aiming to find one or more contents which meet a search criteria set specified by the interest, performs the matching process for verifying whether the content found in the search process matches the search target ID information (face image) to acquire a content regarding the search target, and transmits the
(Continued)

acquired content to a communication device of a content request source.

13 Claims, 19 Drawing Sheets

(51) Int. Cl.
    *H04W 4/029*     (2018.01)
    *G06F 16/55*     (2019.01)
    *G06F 16/583*     (2019.01)
    *G06F 16/535*     (2019.01)
    *G06F 16/9535*     (2019.01)
    *H04L 67/52*     (2022.01)

(52) U.S. Cl.
    CPC ........ *G06F 16/583* (2019.01); *G06F 16/9535* (2019.01); *H04L 67/52* (2022.05); *H04W 4/029* (2018.02)

(56) References Cited

U.S. PATENT DOCUMENTS

| | | | | |
|---|---|---|---|---|
| 2013/0103680 | A1* | 4/2013 | Arrasvuori | G06F 16/332 |
| | | | | 707/769 |
| 2014/0129736 | A1 | 5/2014 | Yu | |
| 2015/0092979 | A1* | 4/2015 | Meredith | H04N 5/77 |
| | | | | 382/103 |

FOREIGN PATENT DOCUMENTS

| | | |
|---|---|---|
| JP | 2016-100886 A | 5/2016 |
| JP | 2016-201758 A | 12/2016 |
| JP | 2017-055380 A | 3/2017 |
| WO | WO 2013/000165 A1 | 1/2013 |

* cited by examiner

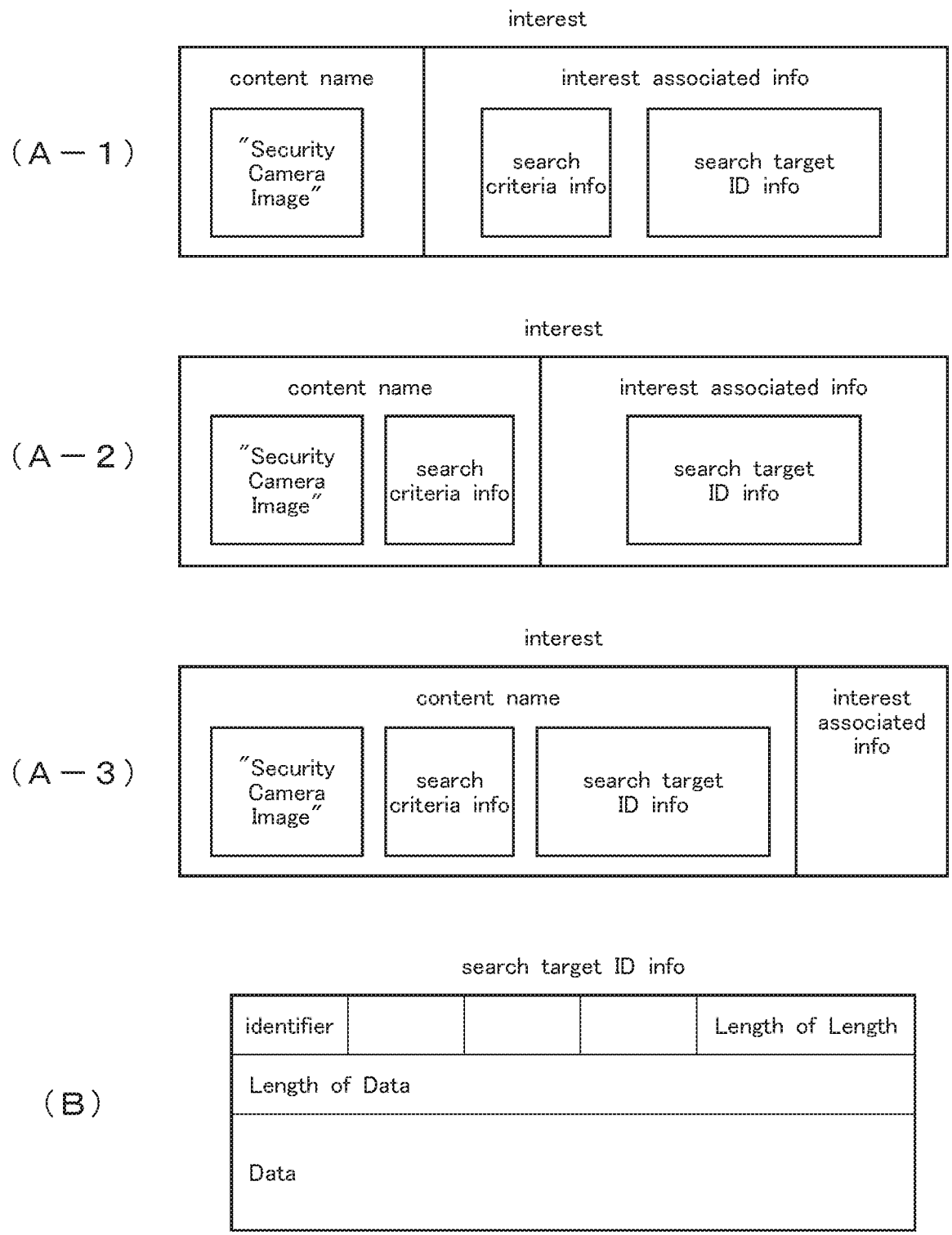

Fig.7 content name

| Security Camera Image |
|---|

(A)

content name

| Security Camera Image # department store 4th floor camera A |
|---|

(B)

content name

| Security Camera Image # department store 4th floor camera A # 20170202, 14:00-15:00 |
|---|

(C)

content name

| Security Camera Image # Sae, Tzk Ward, Yokohama City, KNG Pref., camera A # 20170202, 12:00:00, 1h |
|---|

(D)

content name

| Security Camera Image # E139° 45' N35° 41' # 20170202, 12:00:00, 1h |
|---|

(E)

content name

| /police / Security Camera Image # camera A |
|---|

FIB (Forwarding Information Base)

(A)

| content name | interest transfer interface |
|---|---|
| Security Camera Image # camera A | interface 1 |

PIT (Pending Interest Table)

(B)

| content name | interest receiving interface (content transfer interface) |
|---|---|
| Security Camera Image # camera A | interface 0 |
| Security Camera Image # camera C | interface 2 |

CS (Content Store)

(C)

| content name | content associated info | Storage location of file |
|---|---|---|
| Security Camera Image # camera A | ... | ... |
| Security Camera Image # camera C | ... | ... |

*Fig.9* interest associated infomation

| Security Camera Image # department store 4th floor # 2017/02/02, 14:00:00-15:00:00 |

(A)

interest associated information

| Security Camera Image # Sae, Tzk Ward, Yokohama City, KNG Pref., camera A<br># 2017/02/02, 12:00:00, 1h |

(B)

interest associated information

| Security Camera Image # E138° 34' N33° 29'<br># record time :: 2017/02/01, 13:00:00-2017/02/02 6:00:00 |

(C)

interest associated information

| Security Camera Image # department store 4th floor<br># sex: male # age: 25 # physical attribute: "medium build" |

CS (Content Store)

| content name | content associated info | Storage location of file |
|---|---|---|
| Security Camera Image | department store 4th floor camera A record time 2017/2/2 12:00-13:00 | ... |
| Security Camera Image | department store 3rd floor camera C record time 2017/2/2 14:00-15:00 | ... |

(B)

CS (Content Store)

| content name | content associated info | Storage location of file |
|---|---|---|
| Security Camera Image # camera A | location: E139° 45' N35° 41' time: 2017/02/02, 0:00-2017/02/03 0:00 | ... |
| Security Camera Image # camera B | location: E138° 34' N33° 29' time: 2017/02/01, 13:00-2017/02/02 6:00 | ... |

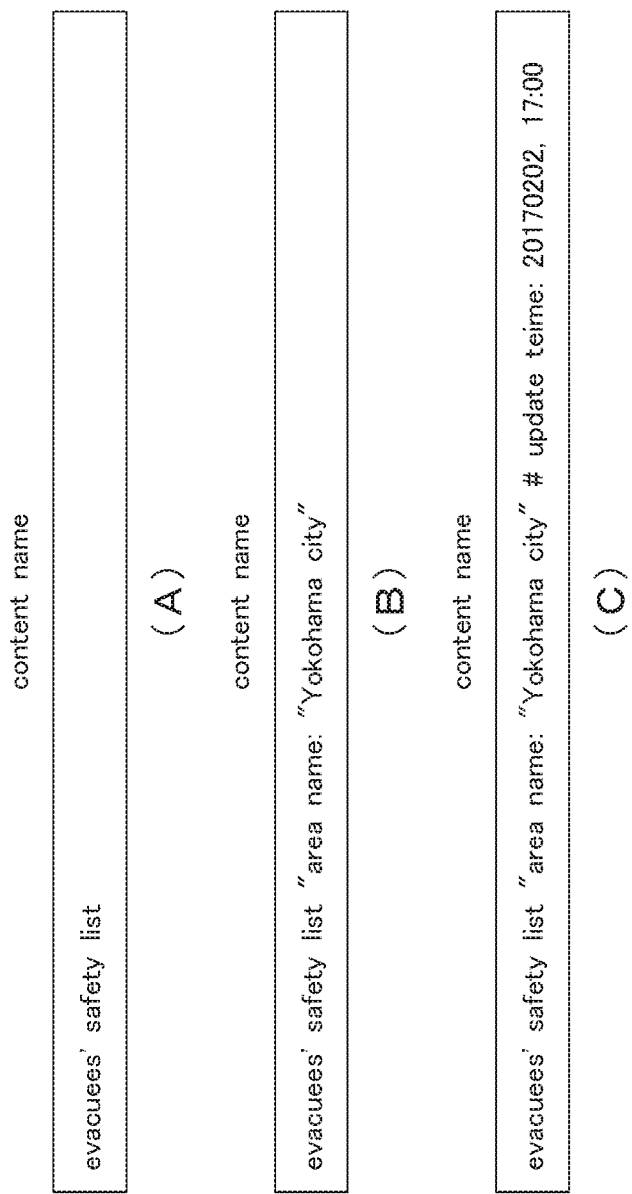

Fig.16 interest associated information

| evacuees' safety list # name: "Taro Tanaka" |

(A)

interest associated information

| evacuees' safety list # area name: "Yokohama city" |

(B)

interest associated information

| evacuees' safety list # area name: "Yokohama city" # name: "Taro Tanaka" |

(C)

interest associated information

| evacuees' safety list # area name: "Yokohama city" # name: "Taro Tanaka"<br># sex: male # age: 25 # physical attribute: "medium build" |

(D)

interest associated information

| evacuees' safety list # area name: "Yokohama city"<br># update time: 2017/02/02: 13:00- # name: "Taro Tanaka |

(E)

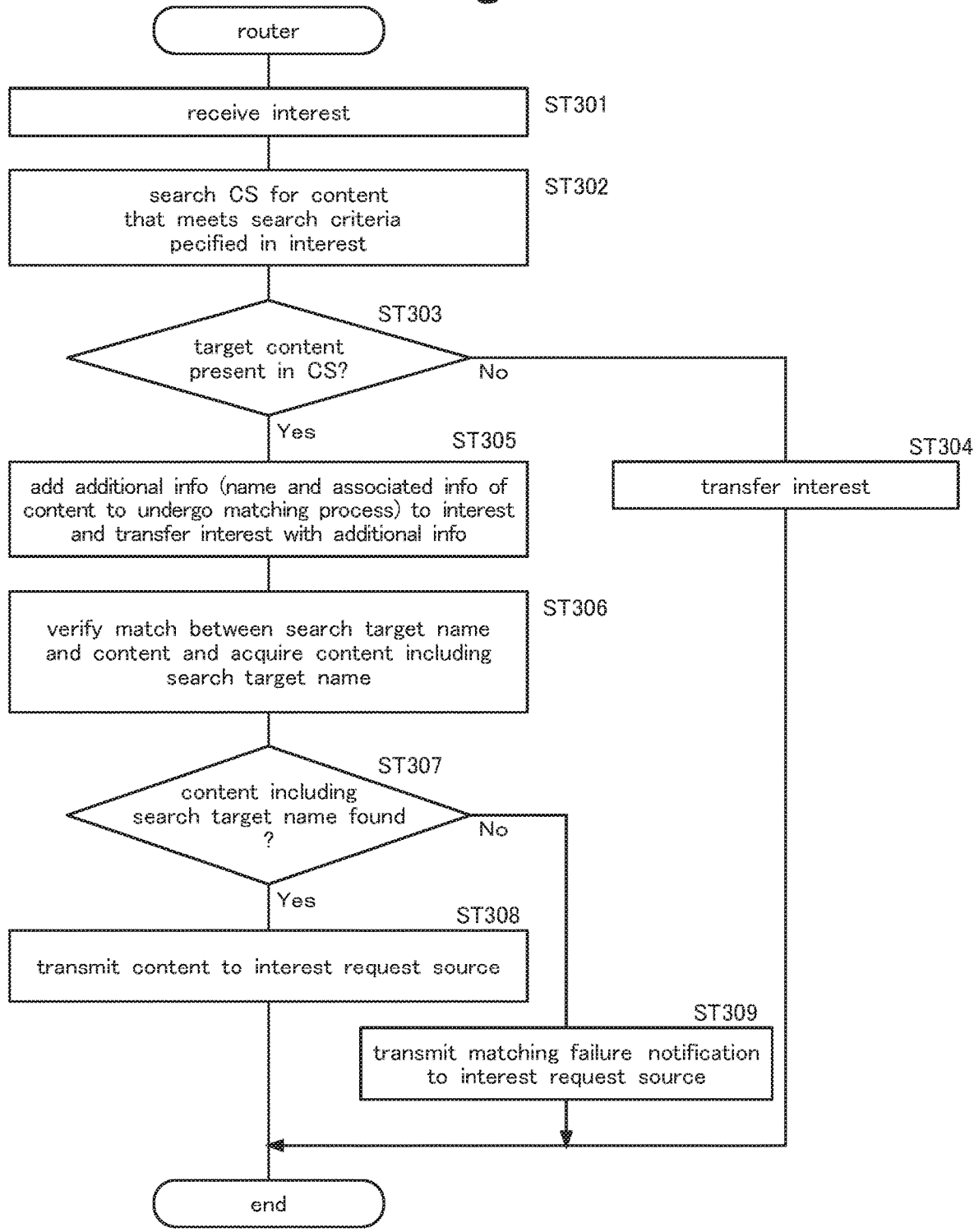

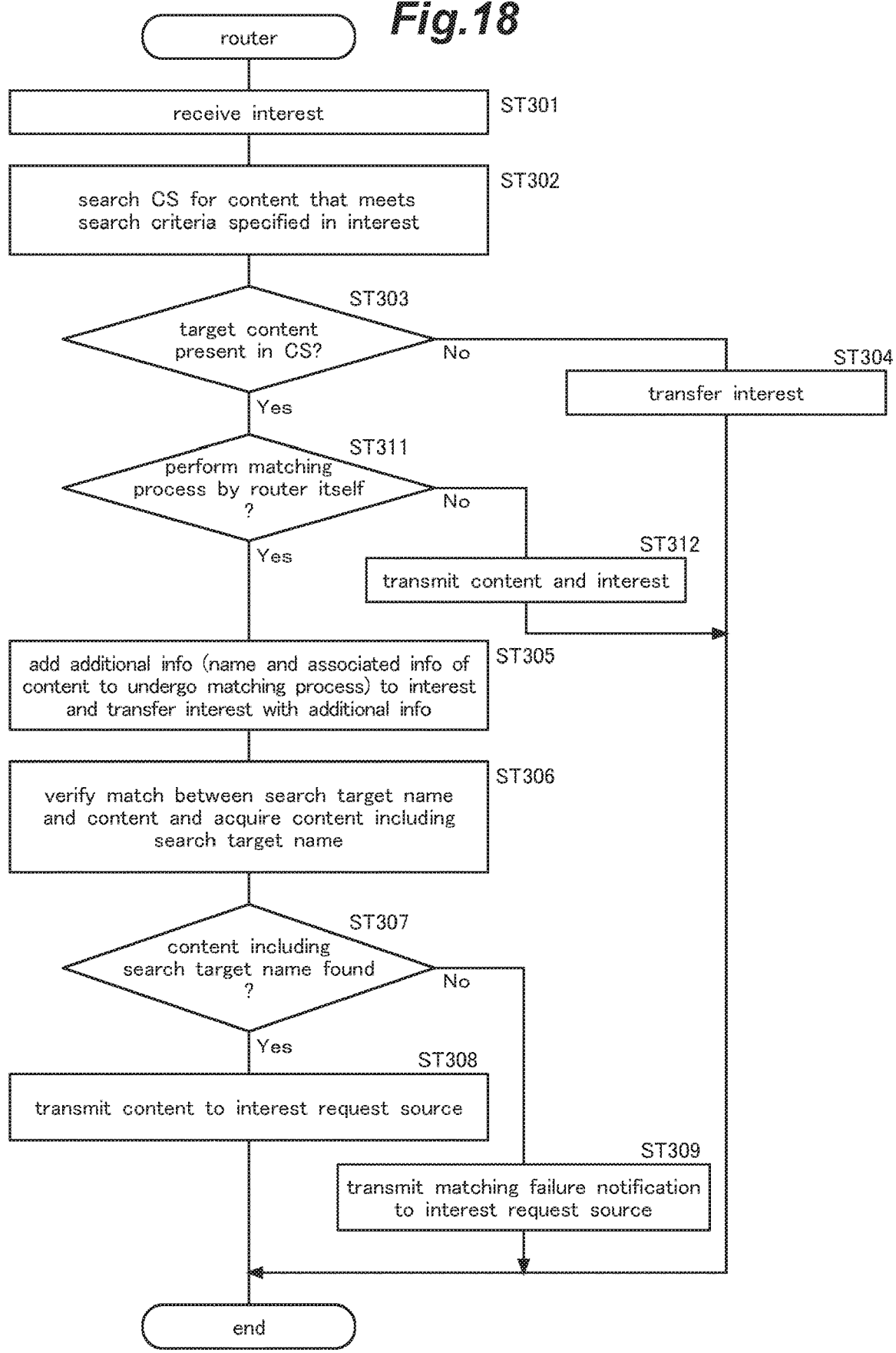

Fig.19 interest associated information

```
content name search method: exact match to content name
location: department store 4th floor
time: 2017/02/02 10:00:00-2017/02/02 12:00:00
matching process: face image matching
matching criteria: 80% or more
image file format: jpg
match result notification method: notify match process NG
```

(A)

interest associated information

```
content name search method: exact match, partial match
location Tzk Ward, Yokohama City, Kanagawa Pref.
E139° 05' -139° 55'N35° 20' - N35° 50'
time: 2017/02/02 10:00-
matching process: face image matching, voice matching,
              face image + clothing image matching
matching criteria: 50% or more, 80% or more, or 90% or more, etc.
image format: jpg, gif, png
match result notification method: notify result only, notify match process NG,
transfer interes
```

(B)

interest associated information

```
matching process
・face image data matching: similarity: 50% or more, 80% or more, or 90% or more, etc.
・voice data matching: similarity: 50% or more, 80% or more, or 90% or more, etc.
・face image data + voice data matching
・face image data + clothing image data matching: image data matching of belongings,
  accessories, glasses, etc.
・others
・odor data matching
・name matching (text)
・pet image matching: dog, cat, bird
・lost article image matching attribute data (matching process)
・sex, age, weight, height
  (gender estimation + face image matching, age estimation + face image matching,
   height estimation + face image matching)

match result notification method
・notify a matching success result only, ignore match process NG,
  notify match process NG camera image data (content) encryption
・encryption ON/OFF, attach public key face image data encryption
・ON/OFF
```

(C)

COMMUNICATION DEVICE, COMMUNICATION SYSTEM, AND CONTENT COLLECTION METHOD

TECHNICAL FIELD

The present invention relates to a communication device connected to a content-centric network, a communication system including a communication device and a content accumulating device, the devices being connected to a content-centric network, and a content correction method for causing a communication device to collect a content regarding a search target from a content accumulator via a content-centric network.

BACKGROUND ART

The Internet is widely used today. In order for a user terminal to acquire a necessary content accumulated in a server through the Internet, the user terminal obtains an IP address of the server so that the user terminal can access the server using the IP address to acquire the content.

In addition, content-centric networking technology is known as an alternative to the Internet (See Patent Document 1, JP2015-212935A). This content-centric network, which is also referred to as CCN (Content-Centric Network), ICN (Information-Centric Network), or NDN (Named Data Network), is designed to enable users to retrieve and collect a content from contents accumulated in a device(s) within a network by using a name of the content.

PRIOR ART DOCUMENT(S)

Patent Document(s)

Patent Document 1: JP2015-212935A

SUMMARY OF THE INVENTION

Task to be Accomplished by the Invention

In a content-centric network, a user can collect a necessary content from a device in the network by adding a content name to an interest (message), the content name including characters (textual information) which identifies a necessary content, and transmitting the interest to the network. However, contents collected from the network by using this method usually include a lot of those which the user does not need.

For example, when a user wants to find a lost child in a department store by using images captured by security cameras installed in the store, the user can form a content name which includes characters "security camera image" and characters identifying a set(s) of location and time which the lost child was supposed to be seen, and transmit an interest with the formed content name to a network. In this case, contents (security camera images) collected from the network usually include a lot of contents in which the lost child is not shown.

For this reason, the user needs to select, among a lot of collected contents indicated in a user terminal, contents with images in which the lost child is seen, which takes a lot of work. A user terminal may perform a matching process on the collected contents by using a face image of the lost child to pick up contents with images in which the lost child is shown. However, use of such a user terminal involves a problem that, when a number of contents are collected, it takes a long time to complete the process to pick up necessary contents.

SUMMARY OF THE INVENTION

Task to be Accomplished by the Invention

The present invention has been made in view of such a problem of the prior art, and a primary object of the present invention is to provide a terminal device, a communication device, a communication system, and a content correction method, which make it possible, by performing a matching process on contents using search target ID information identifying a search target, to properly acquire a content regarding the search target and to shorten a time required to complete the matching process so that a user can acquire a desired content more quickly.

Means to Accomplish the Task

An aspect of the present invention provides a communication device connected to a content-centric network comprising: a storage for accumulating contents; a receiver for receiving an interest to which search criteria set information including a search criteria set and search target ID information are added, the search target ID information identifying a search target; a controller configured to perform: a search process on the contents accumulated in the storage, aiming to find one or more contents which meet the search criteria set; and a matching process for verifying whether the content found in the search process matches the search target ID information to acquire the content regarding the search target; and a transmitter for transmitting the content regarding the search target to a communication device of a content request source.

Another aspect of the present invention provides a communication system including a communication device and a content accumulating device, the devices being connected to a content-centric network, wherein the communication device comprises: a controller configured to generate an interest to which search criteria set information including a search criteria set and search target ID information are added, the search target ID information identifying a search target; a transmitter for transmitting the interest to the content-centric network; and a receiver for receiving the content regarding the search target transmitted from the content accumulating device, wherein the content accumulating device comprises: a storage for accumulating contents; a receiver for receiving an interest to which the information on the search criteria set and search target ID information are added, the search target ID information identifying a search target; a controller configured to perform: a search process on the contents accumulated in the storage, aiming to find one or more contents which meet the search criteria set; and a matching process for verifying whether the content found in the search process matches the search target ID information to acquire a content regarding the search target; and a transmitter for transmitting the content regarding the search target to the communication device.

Yet another aspect of the present invention provides a content correction method for causing a communication device to collect a content regarding a search target from a content accumulator via a content-centric network, the method comprising: the communication device generating an interest to which search criteria set information including a search criteria set and search target ID information are added, the search target ID information identifying a search target, and transmitting the interest to the content-centric network; the content accumulator, upon receiving the interest, performing a search process on contents accumulated therein, aiming to find one or more contents which meet the search criteria set, performing a matching process for verifying whether the content found in the search process matches the search target ID information to acquire a content regarding the search target, and transmitting the acquired content to the communication device; and the communication device receiving the content regarding the search target transmitted from the content accumulator.

Effect of the Invention

According to the present invention, it becomes possible, by performing a matching process on contents using search target ID information identifying a search target, to properly acquire a content regarding the search target. Moreover, the matching process can be performed in parallel by multiple communication devices connected to a content-centric network to thereby shorten a time required to complete the matching process so that a user can acquire a desired content more quickly.

BRIEF DESCRIPTION OF THE DRAWINGS

FIG. 6 is an explanatory diagram showing examples of configurations of an interest;

FIG. 7 is an explanatory diagram showing examples of configurations of a content name;

FIG. 8 is an explanatory diagram showing examples of registered data in FIB (Forwarding Information Base), PIT (Pending Internet Table), and CS (Content Store) stored in a storage 43 of the router 4;

FIG. 9 is an explanatory diagram showing examples of interest associated information;

FIG. 10 is an explanatory diagram showing examples of data registered in CS shown in FIG. 8;

FIG. 15 is an explanatory diagram showing examples of configurations of a content name according to the second embodiment;

FIG. 16 is an explanatory diagram showing examples of interest associated information according to the second embodiment;

FIG. 17 is a flow chart showing an operation procedure of a router 4 when receiving an interest according to the second embodiment;

FIG. 18 is a flow chart showing an operation procedure of a router 4 of when receiving an interest according to a variation of the second embodiment; and FIG. 19 is an explanatory diagram showing examples of interest associated information according to a third embodiment of the present invention;

DESCRIPTION OF THE PREFERRED EMBODIMENT(S)

Figure 1:
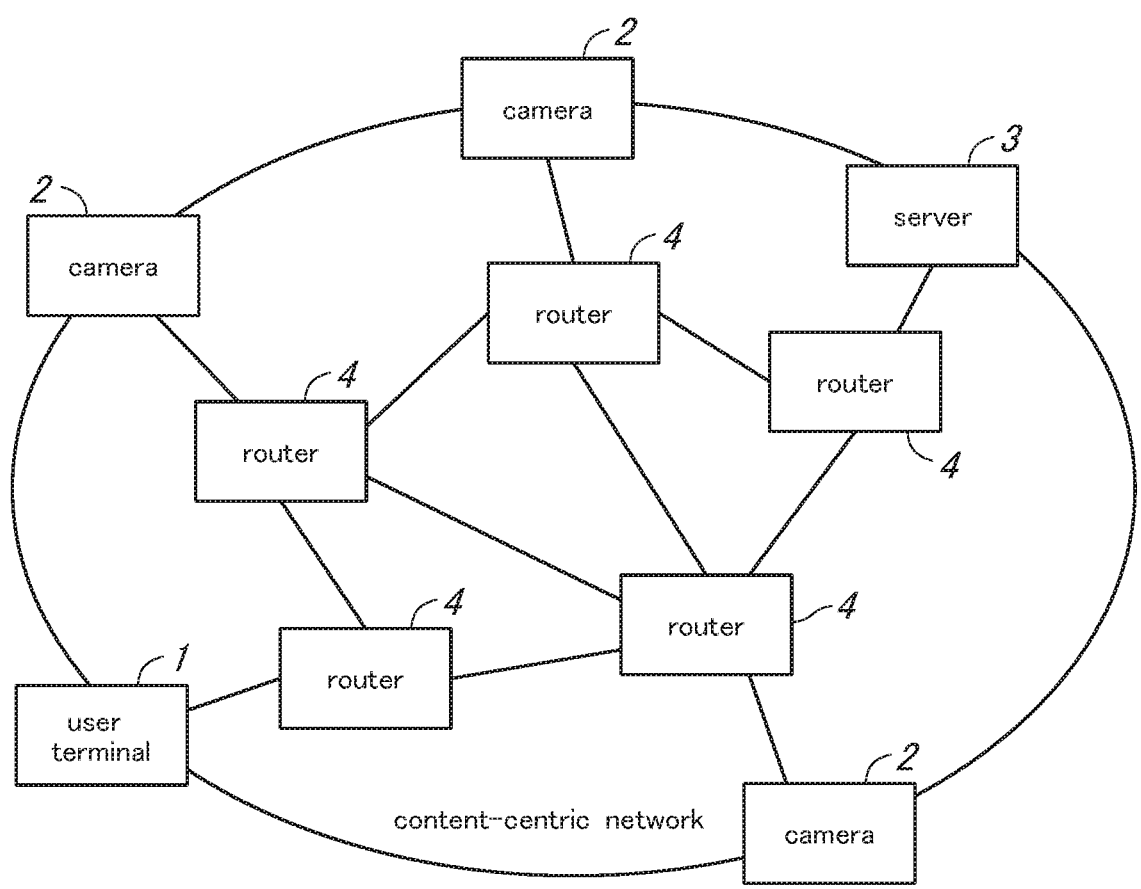
FIG. 1 is a diagram showing a general configuration of a communication system according to a first embodiment of the present invention.

A first aspect of the present invention made to achieve the above-described object is A content correction method for causing a communication device to collect a content regarding a search target from a content accumulator via a content-centric network, the method comprising:

the communication device generating an interest to which search criteria set information including a search criteria set and search target ID information are added, the search target ID information identifying a search target, and transmitting the interest to the content-centric network;

the content accumulator, upon receiving the interest, performing a search process on contents accumulated therein, aiming to find one or more contents which meet the search criteria set, performing a matching process for verifying whether the content found in the search process matches the search target ID information to acquire a content regarding the search target, and transmitting the acquired content to the communication device; and the communication device receiving the content regarding the search target transmitted from the content accumulator.

According to this configuration, it becomes possible, by performing a matching process on contents using search target ID information identifying a search target, to properly acquire a content regarding the search target. Moreover, the matching process can be performed in parallel by multiple communication devices connected to a content-centric network to thereby shorten a time required to complete the matching process so that a user can acquire a desired content more quickly.

A second aspect of the present invention is the communication device of the first aspect, wherein the receiver receives the interest including a content name of the content or interest associated information, wherein the search criteria set information including a search criteria set regarding a time and a location of the content and the search target ID information are added to either of the content name of the content or the interest associated information, and wherein the controller performs the search process based on the search criteria set.

In this configuration, the search process can be performed so as to properly narrow down a scope of contents on which the matching process is to be performed.

A third aspect of the present invention is the communication device of the first aspect, wherein the receiver receives the interest which includes an image of a search target person as the search target ID information, and wherein the controller performs the matching process by using the image of the search target person to acquire the content including the image of the search target person.

This configuration enables a user to acquire a content(s) in which a search target person is shown.

A fourth aspect of the present invention is the terminal device of the second aspect, wherein the communication device of the first aspect, wherein the receiver receives the interest which includes, as the search target ID information, a name of a search target person, and wherein the controller performs the matching process by using the name of the search target person to acquire the content including the name of the search target person.

This configuration enables a user to acquire a content(s) including information indicating a search target person.

A fifth aspect of the present invention is the communication device of the first aspect, wherein the receiver receives the interest to which matching criteria information is added, the matching criteria information identifying criteria used in the matching process, and wherein the controller performs the matching process based on the matching criteria information.

This configuration makes it possible to cause the communication device to perform the matching process based on a matching criteria set specified by a user.

A sixth aspect of the present invention is the communication device of the first aspect, wherein the receiver receives the interest to which matching result notification information is added, the matching result notification information identifying a method of transmitting a notification of a result of the matching process, and wherein the controller, based on the matching result notification information, transmits the notification of the result of the matching process to the content request source.

This configuration makes it possible to cause the communication device to transmit a notification of a result of the matching process by a user-specified method of transmitting a notification.

A seventh aspect of the present invention is the communication device of the first aspect, wherein, in a case where the storage stores the content which meets the search criteria set and the controller performs the matching process on the content, the controller adds content associated information associated with the content to the interest, and then transmits the interests to a different communication device.

This configuration can prevent multiple communication devices from duplicating the matching process on a same content.

An eighth aspect of the present invention is the communication device of the first aspect, wherein, even in a case where the storage stores the content which meets the search criteria set, the controller does not perform the matching process on the content, but causes the transmitter to transmit the content along with the interest to a different communication device.

In this configuration, even a different communication device including no content which meets the search criteria set becomes possible to perform the matching process on contents meeting the search criteria set transmitted from the communication device, thereby preventing a concentration of a processing load to the one communication device.

A ninth aspect of the present invention is the communication device of the eighth aspect, wherein the controller determines whether or not the controller performs the matching process on the content stored in the storage based on at least one of a processing load of the controller, how many content(s) is/are waiting to undergo the matching process, and a capability of the controller.

In this configuration, the communication device can properly determine whether or not the communication device performs the matching process on the content meeting the search criteria set.

A tenth aspect of the present invention is a communication device connected to a content-centric network comprising: a controller configured to generate an interest to which search criteria set information including a search criteria set and search target ID information is added, the search target ID information identifying a search target; a transmitter for transmitting the interest to the content-centric network; and a receiver configured to communicate with a different communication device connected to the content-centric network, wherein the different communication device performs a search process based on the search criteria set, and a matching process based on the search target ID information to acquire a content regarding the search target, and wherein the receiver receives the acquired content regarding the search target from the different communication device.

According to this configuration, it becomes possible, by performing a matching process on contents using search target ID information identifying a search target, to properly acquire a content regarding the search target, and shorten a time required to complete the matching process so that a user can acquire a desired content more quickly, in the same manner as the first aspect of the present invention.

An eleventh aspect of the present invention is a communication system including a communication device and a content accumulating device, the devices being connected to a content-centric network, wherein the communication device comprises: a controller configured to generate an interest to which search criteria set information including a search criteria set and search target ID information are added, the search target ID information identifying a search target; a transmitter for transmitting the interest to the content-centric network; and a receiver for receiving the content regarding the search target transmitted from the content accumulating device, wherein the content accumulating device comprises: a storage for accumulating contents; a receiver for receiving an interest to which the information on the search criteria set and search target ID information are added, the search target ID information identifying a search target; a controller configured to perform: a search process on the contents accumulated in the storage, aiming to find one or more contents which meet the search criteria set; and a matching process for verifying whether the content found in the search process matches the search target ID information to acquire a content regarding the search target; and a transmitter for transmitting the content regarding the search target to the communication device.

According to this configuration, it becomes possible, by performing a matching process on contents using search target ID information identifying a search target, to properly acquire a content regarding the search target, and shorten a time required to complete the matching process so that a user can acquire a desired content more quickly, in the same manner as the first aspect of the present invention.

A twelfth aspect of the present invention is a content correction method for causing a communication device to collect a content regarding a search target from a content accumulator via a content-centric network, the method comprising: the communication device generating an interest to which search criteria set information including a search criteria set and search target ID information are added, the search target ID information identifying a search target, and transmitting the interest to the content-centric network; the content accumulator, upon receiving the interest, performing a search process on contents accumulated therein, aiming to find one or more contents which meet the search criteria set, performing a matching process for verifying whether the content found in the search process matches the search target ID information to acquire a content regarding the search target, and transmitting the acquired content to the communication device; and the communication device receiving the content regarding the search target transmitted from the content accumulator.

According to this configuration, it becomes possible, by performing a matching process on contents using search target ID information identifying a search target, to properly acquire a content regarding the search target, and shorten a time required to complete the matching process so that a user can acquire a desired content more quickly, in the same manner as the first aspect of the present invention.

Embodiments of the present invention will be described below with reference to the drawings.

First Embodiment

FIG. 1 is a diagram showing a general configuration of a communication system according to a first embodiment of the present invention.

The communication system includes a user terminal(s) 1 (communication device; that is, which is capable of serving as a communication device); multiple cameras 2 (imaging device, communication device, content accumulation device), a server 3 (server device, communication device, content accumulation device), and multiple routers 4 (transfer device, communication device, content accumulation device). The user terminal 1, the cameras 2, the server 3, and the routers 4 are connected to each other via a content-centric network.

The user terminal 1 is operated by a user (searcher). In the present embodiment, a user performs a person search; that is, the user collects contents (images captured by cameras) in which a search target person is shown based on a face image of the search target person, aiming to find a location of the search target person. A content (camera image) may be either a video image or a still image.

Each of the cameras 2 captures images of an area near an installation location of the camera. In the present embodiment, security cameras (crime prevention cameras, surveillance cameras) are used as the cameras 2. Each camera 2 stores and accumulates contents (camera images) captured by the camera. In addition, each camera 2 periodically transmits contents (camera images) captured by the camera to the server 3 according to status of the network.

The server 3 accumulates contents (camera images) transmitted from each camera 2.

Each of the routers 4 relays contents (camera images) transmitted from a camera 2 to the server 3. When relaying (forwarding), the router 4 stores the received contents (camera images) in the router. Accordingly, a router 4 located on a transmission path through which a camera 2 transmits contents to the server 3 accumulates contents in the router in a successive manner. It should be noted that contents stored in a router 4 are deleted after a prescribed time period has lapsed.

The content-centric network is designed such that a user terminal 1 can collect one or more contents stored in devices in the network (cameras 2, server 3, and routers 4) by using a content name as a collection key.

In this content-centric network, when an interest (content request message) is transmitted from a user terminal 1 of a content request source, each of the routers 4 receives the interest, and then transfers the received interest to a neighboring device. The transfer of the interest is repeated sequentially at respective routers 4, and the interest finally arrives at a camera 2 or the server 3.

Upon receiving the interest, a router 4, a camera 2, or the server 3 selects, among contents stored therein, one or more contents associated with a content name added to the interest, and transmits the selected contents to the user terminal 1 of the content request source.

In the present embodiment, as the user (searcher) specifies a search criteria set or a face image of a search target person in the user terminal 1 of the content request source, the user terminal 1 generates an interest to which search criteria information including the search criteria set and the face image are added as a content name or interest associated information (hereafter "Int Assocd information"), and transmits the generated interest to the network.

Upon receiving the interest, a router 4, a camera 2, or the server 3 performs a search process, aiming to find one or more contents which meet the search criteria set added to the interest, then perform a matching process on each of the found contents by using the face image added to the interest to thereby acquire a content in which the search target person is shown, and then transmits the acquired content to the user terminal 1 of the content request source (a transmission source of the interest).

In this way, in the present embodiment, contents (camera images) captured by each camera 2 can be accumulated in the routers 4, the cameras 2, and the server 3, and the matching process can be performed in parallel by the routers 4, the cameras 2, and the server 3. As a result, the communication system in the present embodiment can reduce a processing load on the server 3 and shorten a time required to collect a content requested by the user terminal, compared to a system in which contents are accumulated only in a server and the matching process is performed by the server.

Figure 2:
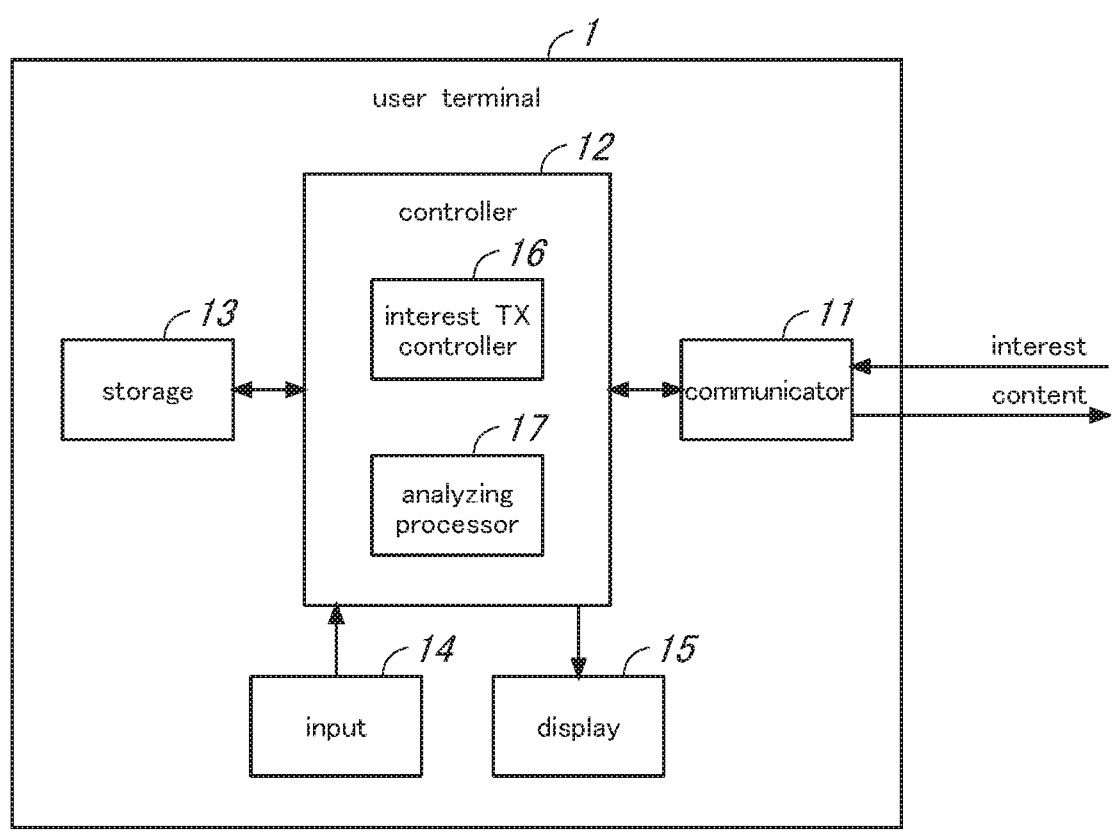
FIG. 2 is a block diagram showing a schematic configuration of a user terminal 1.

Next, a schematic configuration of a user terminal 1 will be described. FIG. 2 is a block diagram showing a schematic configuration of the user terminal 1.

The user terminal 1 includes a communicator 11 (receiver, transmitter), a controller 12, a storage 13, an input 14, and a display 15.

The communicator 11 transmits an interest to the content-centric network and receives one or more contents transmitted from the content-centric network as a response to such an interest.

The storage 13 stores programs executed by the controller 12 and one or more contents received by the communicator.

Through the input 14, a user conducts an input operation to specify a search criteria set, a face image of a search target person, and other information. The display 15 displays one or more contents received by the communicator 11 and an analysis result information generated by the controller 12.

The controller 12 includes an interest transmission controller 16 and an analyzing processor 17. The controller 12 is implemented by a processor, and each part of the controller 12 is implemented by causing the processor to execute a program stored in the storage 13.

The interest transmission controller 16 receives search criteria information including a search criteria set (hereafter, also referred to as simply "search criteria information") and a face image of a search target person, which are both provided and specified by the user, and then generates an interest including a content name and Int Assocd information, to either of which the search criteria information and the face image of the search are added, respectively, and causes the communicator 11 to transmit the generated interest to the network.

The analyzing processor 17 performs an analysis process on one or more contents received by the communicator 11, and generates movement path information regarding one or more movement paths of the search target person, and other information.

Figure 3:
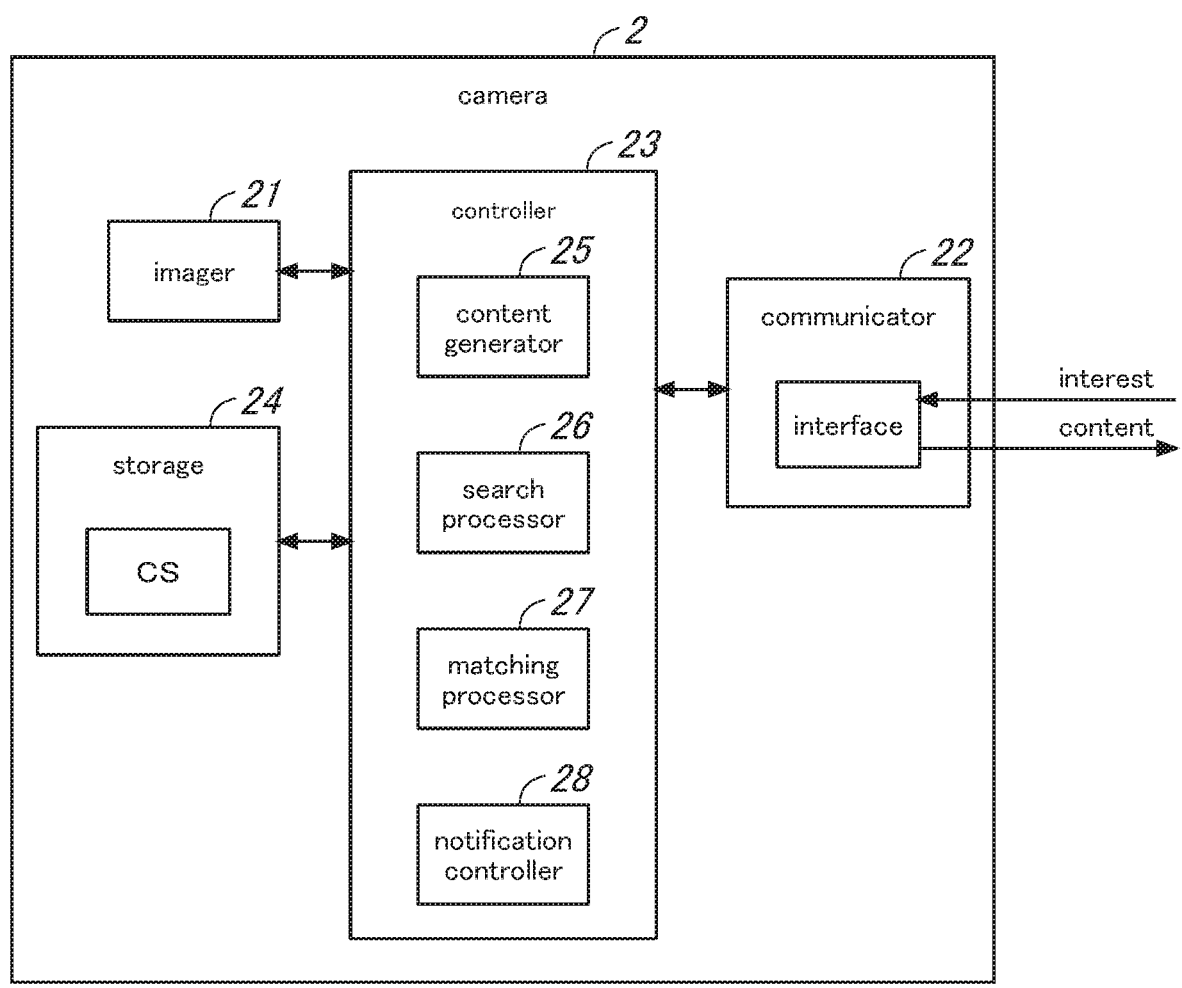
FIG. 3 is a block diagram showing a schematic configuration of a camera 2.

Next, a schematic configuration of a camera 2 will be described. FIG. 3 is a block diagram showing a schematic configuration of the camera 2.

The camera 2 includes an imager 21, a communicator 22 (receiver, transmitter), a controller 23, and a storage 24.

The imager 21 captures images of an area near the camera and outputs the captured images.

The communicator 22 includes an interface for transmitting and receiving interests and contents to and from the content-centric network.

The storage 24 accumulates contents (camera images) generated by the controller 23. The storage 24 stores programs executed by the controller.

Since the storage 24 has a limited storage capacity, when contents are accumulated to an amount that the storage stores during a prescribed time period, the communicator 22 transmits the amount of contents to the server 3 to ensure free space in the storage.

The controller 23 includes a content generator 25, a search processor 26, a matching processor 27, and a notification controller 28. This controller 23 is implemented by the processor, and each part of the controller 23 is implemented by causing the processor to execute a program stored in the storage 24.

The content generator 25 generates a content (camera image) which includes a captured image output from the imager 21 and attribute information including information on a location (e.g., shooting location) and a time (e.g., shooting time). The attribute information may be managed as data distinct from a content, or may be managed as a content name or content associated information.

With regard to the search processor 26, when the communicator 22 receives an interest, the search processor 26 acquires search criteria information including a search criteria set included in a content name of the interest, and performs the search process on contents accumulated in the storage 24, aiming to find one or more contents which meet the search criteria set.

The matching processor 27 performs, by using a face image of a search target person added to an interest, the matching process for verifying whether or not the face image of the search target person is shown in each content (camera image) found by the search processor 26.

With regard to the notification controller 28, in cases where one or more contents which meet the search criteria set are present and a content in which a face of a search target person is shown is found, the notification controller 28 transmits the content to a content request source. In cases where one or more contents which meet the search criteria set are present, but no content in which a face of a search target person is shown is found, the notification controller 28 transmits a matching failure notification to a content request source.

Figure 4:
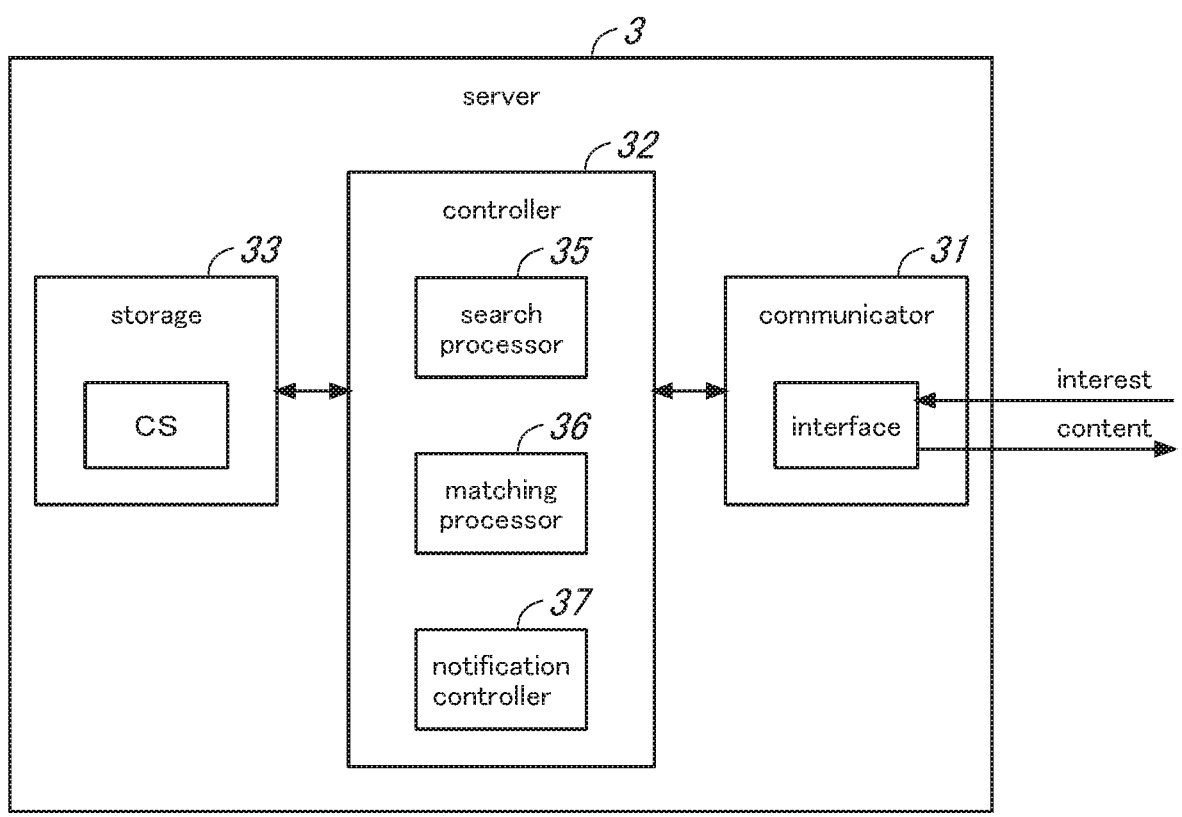
FIG. 4 is a block diagram showing a schematic configuration of a server 3.

Next, a schematic configuration of a server 3 will be described. FIG. 4 is a block diagram showing the schematic configuration of the server 3.

The server 3 includes a communicator 31 (receiver, transmitter), a controller 32, and a storage 33.

The communicator 31 includes an interface for transmitting and receiving interests and contents to and from the content-centric network.

The storage 33 accumulates contents received by the communicator 31. The storage 33 stores programs executed by the controller 32.

The controller 32 includes a search processor 35, a matching processor 36, and a notification controller 37. The controller 32 is implemented by the processor, and each part of the controller 32 is implemented by causing the processor to execute a program stored in the storage 33.

With regard to the search processor 35, when the communicator 31 receives an interest, the search processor 35 acquires search criteria information including a search criteria set included in a content name of the interest, and performs the search process on contents accumulated in the storage 33, aiming to find one or more contents which meet the search criteria set.

The matching processor 36 performs, by using a face image of a search target person added to an interest, the matching process for verifying whether or not the face image of the search target person is shown in each content (camera image) found by the search processor 35.

With regard to the notification controller 37, in cases where one or more contents which meet the search criteria set are present and a content in which a face of a search target person is shown is found, the notification controller 37 transmits the content to a content request source. In cases where one or more contents which meet the search criteria set are present, but no content in which a face of a search target person is shown is found, the notification controller 37 transmits a matching failure notification to a content request source.

Figure 5:
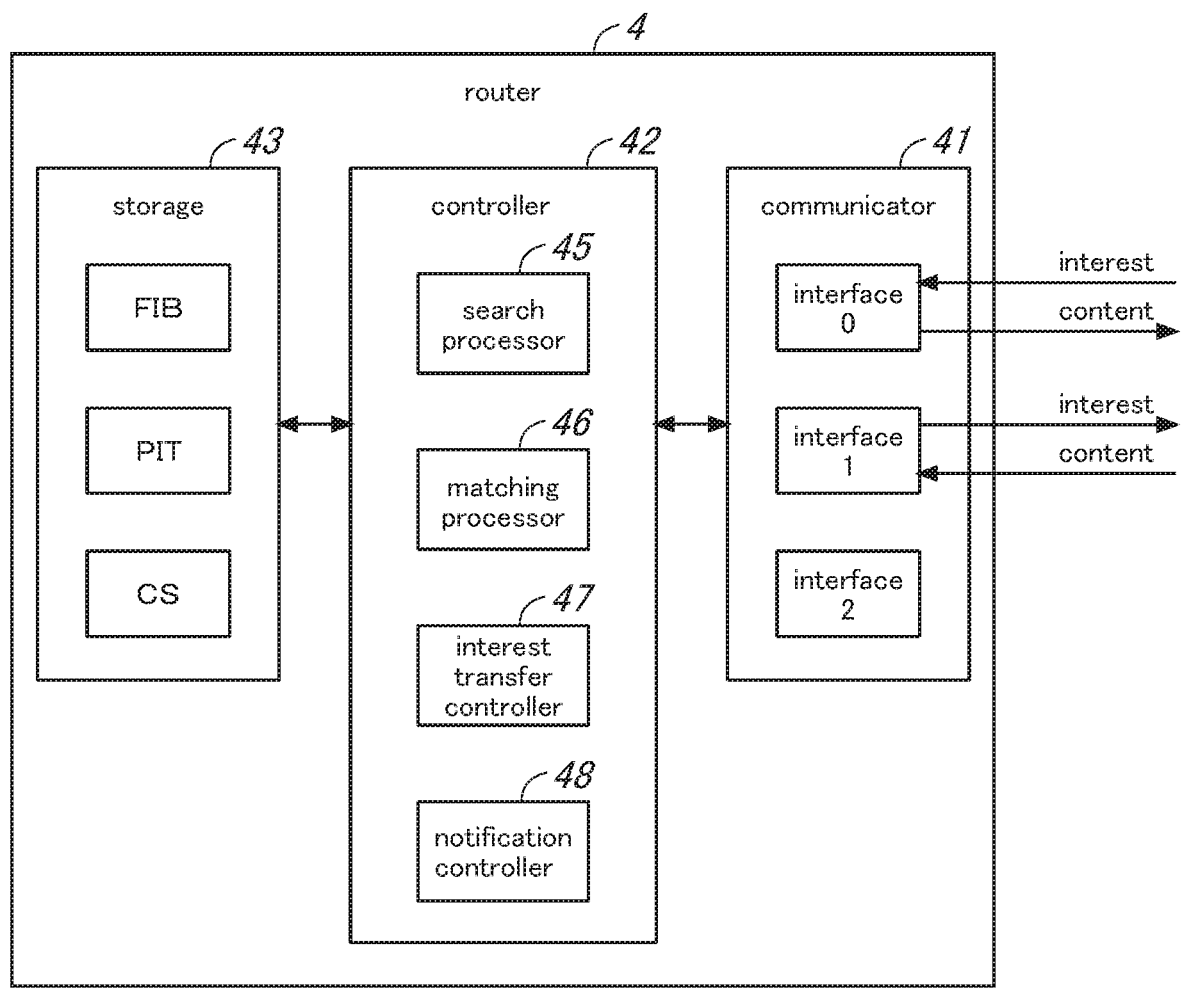
FIG. 5 is a block diagram showing a schematic configuration of a router 4.

Next, a schematic configuration of a router 4 will be described. FIG. 5 is a block diagram showing a schematic configuration of the router 4.

The router 4 includes a communicator 41 (receiver, transmitter), a controller 42, and a storage 43.

The communicator 41 includes multiple interfaces for transmitting and receiving interests and contents to and from the content-centric network. Each interface receives and transfers interests and contents. For example, when an interface 0 receives an interest, the interest is transferred from an interface 1. When the interface 1 receives a content transmitted as a response from an interest transfer destination, the content is transferred from the interface 0 to an interest transmission source.

The storage 43 includes data groups: FIB (forwarding information base), PIT (pending interest table), and CS (content store). In addition, the storage 43 stores programs executed by the processor, which implements the controller 42.

FIB is route information (routing table) regarding interest transfer. An interest transfer destination is determined with reference to FIB.

PIT is route information (routing table) regarding content transfer. A transfer destination interface of a content is determined with reference to PIT. It should be noted that the transfer destination of a content is an interest transmission source for an interest corresponding to the content (interface that received the interest).

CS accumulates contents transmitted in response from an interest transfer destination and received by an interface. When a router 4 is located on a transmission path through which a camera 2 transmits contents to the server 3, the router 4 accumulates the contents in CS.

The controller 42 includes a search processor 45, a matching processor 46, an interest transfer controller 47, and a notification controller 38. This controller 42 is implemented by the processor, and each part of the controller 42 is implemented by causing the processor to execute a program stored in the storage 43.

With regard to the search processor 45, when the communicator 41 receives an interest at an interface thereof, the search processor 45 acquires search criteria information including a search criteria set included in a content name of the interest, and performs the search process on contents accumulated in CS of the storage 43, aiming to find one or more contents which meet the search criteria set.

The matching processor 46 performs, by using a face image of a search target person added to an interest, the matching process for verifying whether or not the face image of the search target person is shown in each content (camera image) found by the search processor 45.

The interest transfer controller 47 controls the transfer of interests. In the present embodiment, in cases where no content which meets the search criteria set is present in CS, or in cases where one or more contents which meet the search criteria set are present, but any content does not show a search target person, the interest transfer controller 47 transfers the interest.

With regard to the notification controller 48, in cases where one or more contents which meet the search criteria set are present and a content in which a face of a search target person is shown is found, the notification controller 48 transmits the content to a content request source. In cases where one or more contents which meet the search criteria set are present, but no content in which a face of a search target person is shown is found, the notification controller 48 transmits a matching failure notification to a content request source.

Next, configurations of an interest will be described. FIG. 6 is an explanatory diagram showing examples of configurations of the interest.

An interest is comprised primarily of a content name and Int Assocd information, and the content name includes characters (for example, "security camera image") representing contents (type) of the content. In the present embodiment, additional information added to an interest includes: search target ID information (face image) for identifying a search target person; and search criteria information including a search criteria set associated with the content, in addition to the above-described characters. The search target ID information and the search criteria information may be included in the content name and/or the Int Assocd information.

In an example shown in FIG. 6A-1, a content name includes characters ("security camera image") representing contents (type) of a content, and Int Assocd information includes search criteria information and search target ID information (face image).

In an example shown in FIG. 6A-2, a content name includes characters ("security camera image") representing contents (type) of a content and search criteria information, and Int Assocd information includes search target ID information (face image).

In an example shown in FIG. 6A-3, a content name includes characters ("security camera image") representing contents (type) of a content and search criteria information and search target ID information (face image).

Preferably, when the content name includes search target ID information, binary data of the search target ID information may be converted into text data in accordance with a Base64 conversion table, for example.

In an example shown in FIG. 6B, a header area of search target ID information includes an identifier which indicates that an image is stored. Further, the search target ID information header area stores a data length of the search target ID information (Length of Data) and a data length size (Length of Length). In this way, the search target ID information can be added to the interest as binary data.

Next, an example in which necessary information is added to a content name of an interest will be described.

FIG. 7 is an explanatory diagram showing examples of configurations of a content name.

In the exampled shown in FIG. 7, a content name includes: as a search criteria set, characters ("security camera image") representing contents (type); location information; time information of a content; and/or other information, where the location information indicates a location at which a camera image was taken, and the time information indicates a time when the camera image was taken.

In an example shown in FIG. 7A, a content name includes only characters ("security camera image") representing contents (type) of the content.

In an example shown in FIG. 7B, a content name includes pieces of information on, in addition to characters representing contents (type) of the content, location information including pieces of information, facility, floor number, and name of a camera 2. In the content name, pieces of information are separated each other by a symbol (#). The content name may include location information specifying an expanded location such as a whole facility in place of floor number, or a limited location such as a facility (such as "department store") and its specific area (such as "toy section").

In an example shown in FIG. 7C, a content name includes pieces of information on, in addition to characters representing contents (type) of the content and location information, time information including date and time of shooting (year/month/day, starting time and ending time of shooting).

In an example shown in FIG. 7D, a content name includes pieces of information on, in addition to characters representing contents (type) of the content, location information including names of places (Pref., City . . . ), time information including date and time of a shooting period (year/month/day, starting time and ending time of shooting). The location information may be changed to specify an expanded area such as a whole area of a prefecture, or a more limited area such as a specific address.

In an example shown in FIG. 7E, a content name includes pieces of information on, in addition to characters representing contents (type) of the content and time information, location information including longitude and latitude.

In an example shown in FIG. 7F, a content name includes pieces of information on, in addition to characters representing contents (type) of the content, name of organizations that manages cameras or name of organization that manages the content (such as police), and name of a camera 2. In this content name, pieces of information are separated each other by a symbol (/) that stratifies the location of the content. In the example of FIG. 7F, the content name specifies a security camera image taken by a camera 2 managed by police.

Next, registered data in FIB, PIT, and CS in the storage 43 of a router 4 will be described. FIG. 8 is an explanatory diagram showing examples of registered data in FIB, PIT, and CS stored in the storage 43 of the router 4.

As shown in FIG. 8A, FIB includes pieces of information on Content name and Interest transfer interface. In the example shown in FIG. 8A, upon receiving an interest requesting a security camera image, the interest is transferred to Interface 1.

As shown in FIG. 8B, PIT includes pieces of information on Content name and Interest receiving interface (Content transfer interface). In the example shown in FIG. 8B, PIT shows that an interest designating a security camera image taken by Camera A was received at Interface 0, and that an interest designating a security camera image taken by Camera B was received at Interface 2.

As shown in FIG. 8C, CS includes pieces of information on Content name, Int Assocd information and Storage location (address) of content file data.

Next, an example in which necessary information is added to Int Assocd information will be described. FIG. 9 is an explanatory diagram showing examples of Int Assocd information.

In the examples shown in FIG. 7, a content name includes search criteria information (such as location information, time information), whereas, in the examples shown in FIG. 9, search criteria information is included in Int Assocd information.

In the examples shown in FIG. 9, characters (for example, "security camera image") representing contents (type) of a content are included in Int Assocd information. However, characters representing contents (type) of a content may be included in a content name.

In an example shown in FIG. 9A, Int Assocd information includes location information including facility name and floor number, and time information including date and time of shooting (year/month/day, starting time and ending time of shooting). When a user of a user terminal 1, which has been received a content, needs to acquire other contents with time information specifying times around the time in the received content, the user can use Int Assocd information to designate a time range around the time.

In an example shown in FIG. 9B, Int Assocd information includes location information including names of places (Pref., City . . . ) and name of a camera 2; and time information including date and time of shooting (year/month/day, starting time and ending time of shooting).

In an example shown in FIG. 9C, Int Assocd information includes, in addition to time information, location information including longitude and latitude.

In an example shown in FIG. 9D, Int Assocd information includes, in addition to location information, search target ID information including attributes of a person (gender, age, appearance). By specifying such attributes of a person in this way, the accuracy of a result of the matching process can be increased. In this case, a router 4, a camera 2, and the server 3 use image recognition processing on one or more contents (camera images) to obtain person attributes.

The routers 4, the cameras 2, and the server 3 hold contents with respective content associated information added thereto. When receiving Int Assocd information added to an interest, a router 4, a camera 2, or the server 3 performs the search process for verifying whether the search criteria set in the Int Assocd information matches content associated information of contents, aiming to find one or more contents which meet the search target.

In the examples shown in FIG. 9, a search criteria set is included in Int Assocd information. However, a search criteria set may be included in a content name, and another search criteria set may be further included in Int Assocd information.

Next, data registered in CS in the examples of FIG. 9 will be described. FIG. 10 is an explanatory diagram showing examples of data registered in CS. In the case of a router 4, data is registered in CS when receiving a content as a response to an interest. In the case of a camera 2, data is registered in CS when the camera creates a content. In the case of the server 3, data is registered in CS when the server 3 receives a content from a camera 2. In the case of a router 4, data is also registered in CS when a content is transferred from a camera 2 to the server 3.

In the examples shown in FIG. 9, Int Assocd information including a search criteria set is added to an interest and transmitted with the interest. In this case, a router 4 which receives the interest performs the search process on CS in its storage 43; that is, the router 4 uses a content name and Int Assocd information including the search criteria set to verify whether or not CS includes one or more contents which meet the search criteria set. When such contents are found, the router 4 uses a storage location (address) of content file data registered in CS to retrieve the content and transmit it to an interest transmission source.

In examples shown in FIG. 10, when receiving a content, a router 4 stores a content name, content associated information associated with the content, and a storage location (address) of content file data in CS as registered data.

In an example shown in FIG. 10A, CS indicates that a target area is a department store (specific facility). In this case, characters ("security camera image") representing contents (type) of a content is registered as a content name, and location information (an installation location and a name of a camera 2) and time information (year/month/day, starting time and ending time of shooting) are registered as content associated information.

In an example shown in FIG. 10B is, CS indicates a target area is an area indicated on a map. In this case, characters ("security camera image") representing contents (type) of a content and a name of a camera 2 are registered as a content name, and location information (longitude and latitude of an installation location of the camera 2) and time information (year/month/day, starting time and ending time of shooting) are registered as content associated information.

Figure 11:
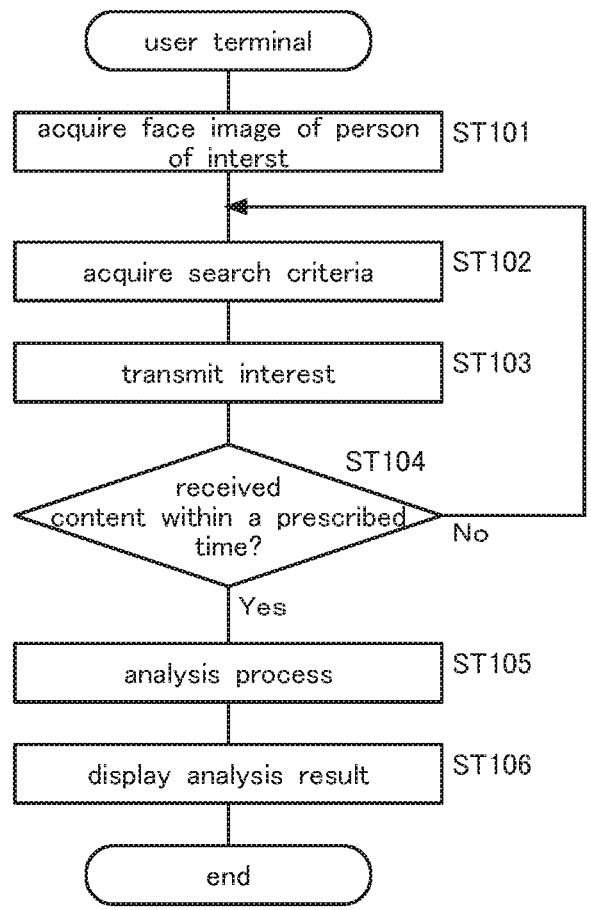
FIG. 11 is a flow chart showing an operation procedure of a user terminal 1.

Next, an operation procedure of a user terminal 1 will be described. FIG. 11 is a flow chart showing an operation procedure of the user terminal 1.

First, the interest transmission controller 16 of the user terminal 1 acquires a face image of a search target person designated by a user (searcher) (ST101). Then, the user terminal 1 acquires search criteria information (location information, time information, and other information) input by the user (ST102). Next, the user terminal 1 generates an interest with a content name (such as "security camera image") including the search criteria information and the face image and Int Assocd information added thereto, and transmits the interest to the content-centric network (ST103).

When the user terminal 1 cannot receive a content (camera image) corresponding to the transmitted interest within a predetermined time (No in ST104), the process returns to the step of acquiring search criteria information (ST102), in which the user terminal encourages the user to change the search criteria set so as to acquire new search criteria information, and transmits an interest again (ST103). In this step, the search criteria set may be changed so as to expand an area designated as the location information, expand a time range designated as the time information and/or make other changes.

When the user terminal receives a content (camera image) within a predetermined time (Yes in ST104), the analyzing processor 17 of the user terminal performs the analysis process on the received content (ST105). Next, the user terminal generates a result of the analysis process; that is, information on the search target person, and displays the generated information on the display 15, thereby presenting the information to the user (ST106).

In the analysis process (ST105), when multiple contents are received, the analyzing processor arranges the multiple contents in time series based on the time information (shooting time) of the respective contents, and generates movement path information on possible movement paths of the search target person based on the location information (shooting location) of each content. In this step, the analyzing processor excludes any content with time or location of shooting which is not consistent with possible movement paths of the search target person.

Next, based on the generated movement path information, the user terminal determines a place where the search target person is likely to be currently present based on the movement path information for the search target person, and calculates the probability that the search target person is present in that place. When the search target person stays at the same place for a while, which can happen, for example, when a lost child gets tired and rests at a toy section of a department store, the user terminal can determine that the search target person is likely to be present at that place. In other cases, when the last content (camera image) shows, for example, that the search target person is leaving the department store, the user terminal can determine that the search target person is highly likely to be outside the department store.

It should be noted that, although, in the present embodiment, one or more contents (camera images) which meet the search criteria set specified by an interest are found, this system is configured such that, when no content (camera image) which shows a search target person is found, a matching failure notification is transmitted to a user terminal 1 of a content request source. Thus, when the user terminal 1 receives a matching failure notification, the user terminal encourages the user to change the search criteria set and transmits an interest again.

Next, as an analysis result, the location where the search target person is likely to be currently present and the probability that the person is present at the location are displayed on the display 15.

Furthermore, the user terminal identifies a camera 2 which can capture the place where the search target person is likely to be present, instructs the camera 2 to transmit a video showing the place in real time, and displays the video on the display 15. As a result, the user can verify whether or not the search target person is currently present there.

Moreover, although, in the present embodiment, the user terminal 1 is configured to perform the analysis process on the received content to generate various types of information, the user terminal may be configured to simply display the received content (camera image) on the display 15. In this case, the received contents are preferably displayed in time series.

Alternatively, the analysis process may be performed by a different analyzing device (information processing device), not by the user terminal 1 which transmits an interest and receives one or more contents.

Figure 12:
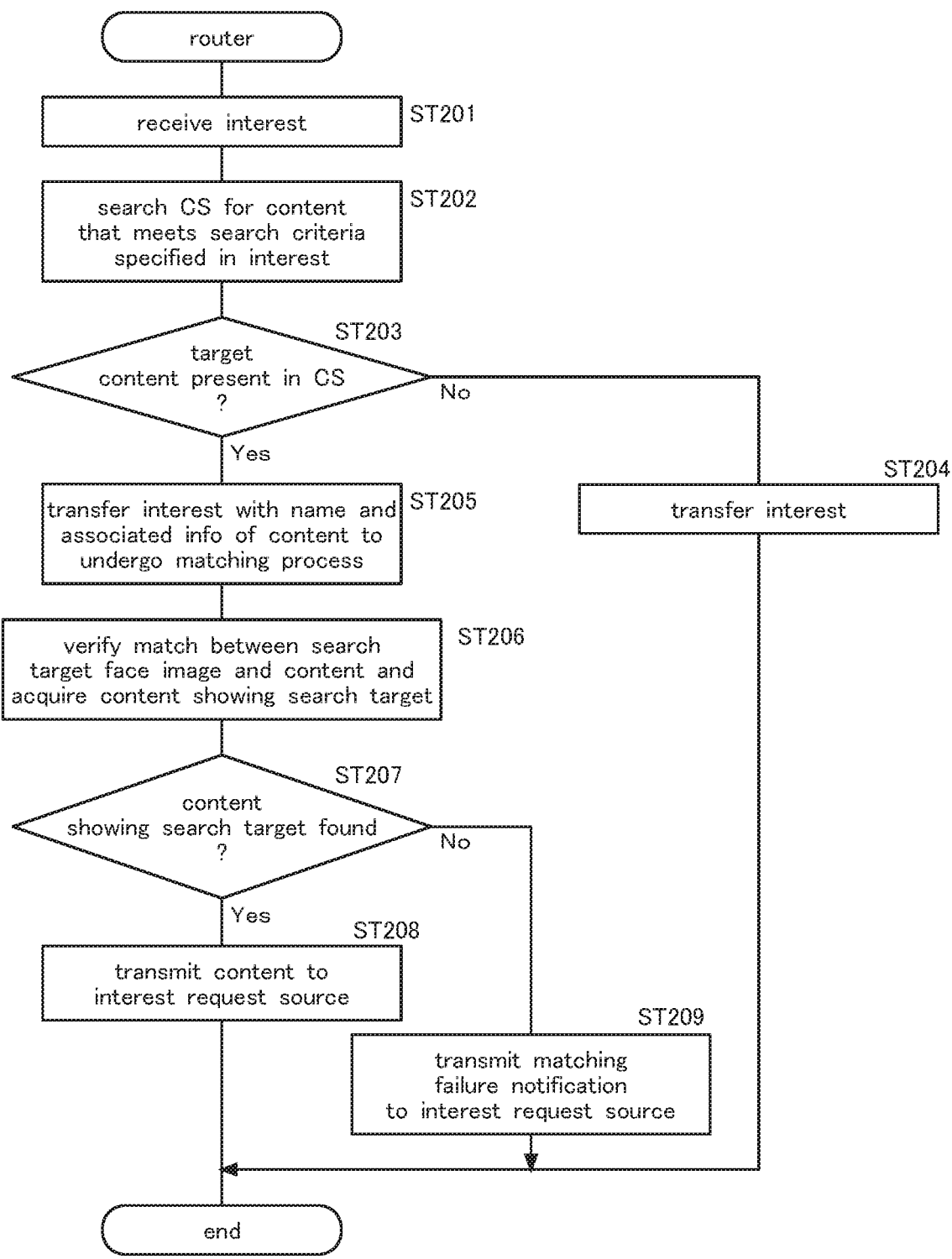
FIG. 12 is a flow chart showing an operation procedure of a router 4 when receiving an interest.

Next, an operation procedure of a router 4 when receiving an interest will be described. FIG. 12 is a flow chart showing an operation procedure of the router 4 when receiving an interest.

First, in a router 4, an interface (e.g., interface 0) of the communicator 41 of the router 4 receives an interest (ST201). Then, the search processor 45 performs a search process on CS in the storage 43, aiming to find one or more contents (camera images) which meet a search criteria set specified by the interest; that is, the search criteria set (for example, "security camera image") included in a content name or Int Assocd information of the interest (ST202). In the search process, the search may be made either for an exact match or a partial match.

It should be noted that, in ST202, the router 4 does not need to perform the search process on contents on which a different router 4 or another device is to perform the matching process. In this case, since a search criteria set includes certain content associated information that is added to contents on which a different router 4 is to perform the matching process, the router may complete the search process without performing the search process on the contents with such content associated information.

When no content which meets the search criteria set is stored in CS (No in Step ST203), the interest transfer controller 47 determines, referring to FIB in the storage 43, an interest transfer destination such as an adjacent router 4 or the server 3, and then transfers the interest from an interface for the interest transfer destination (e.g., interface 1) to the destination (ST204). Concurrently, the router 4 stores an interface (e.g., interface 0) for an interest transmission source in the storage 43.

When one or more contents which meet the search criteria set are present in CS (Yes in ST203), the interest transfer controller 47 adds a content name of the contents along with content associated information (such as location information and time information) to the interest (where the contents meet the search criteria set, i.e. the contents including a face image which is to undergo the matching process), and then transfers the interest with the content name and other information to an interest transfer destination (ST205).

Next, the matching processor 46 performs the matching process by using the face image of the search target person added to the interest to verify whether or not the search target person is shown in the content (camera image) (ST206). In an example of the matching process, the matching processor 46 extracts a person's face image from a content which is to undergo the matching process, and verifies whether or not the extracted person's face image is the same as the face image added to the interest.

When a result of the matching process indicates that content showing the search target person is found (Yes in ST207), the content is transmitted from an interface for a content request source (e.g., interface 0) to the destination (ST208).

When no content showing a search target person is found (No in ST207), the notification controller 48 transmits a matching failure notification from an interface for a content request source (e.g., interface 0) to the destination, where the matching failure notification notifies that one or more contents which match the search criteria set are present but no content showing a face of a search target person is found (ST209).

In this way, in the present embodiment, a router, before starting the matching process, adds a content name and content associated information to an interest, and transfers the interest with the content name and the content associated information to a destination. This configuration addresses a problem that, in some cases, the matching process takes much time. Thus, when the matching process does not take much time, a router may, after the matching process produces a result, add the result that no content showing a face of a search target person is present, together with a content name and content associated information, to an interest, and then transfers the interest with the result to a destination. When a result of the matching process shows that a content in which a face image of a search target person is shown is present, there is no need for the router to transfer the interest to an interest request source.

By adding to an interest a content name and content associated information of one or more contents which are to undergo the matching process, and then transferring the interest, a different router 4 which receives the interest becomes unnecessary to perform the matching process on any content with the same content name and/or the same content associated information. One reason why multiple routes 4 can hold the same contents is that routers 4 located on a transfer path from a camera 2 to the server 3 can hold the same contents. Another reason is that routers located on a transfer path between a user terminal that requested the interest and a device which responded the request, the device being any of a router 4, the server 3 and a camera 2, can hold the same contents. Since multiple user terminals can request a same content at different times, respectively, different routers 4 can respond to the same interest at respective different times.

When the interest includes a content name and content associated information of a content which has undergone the matching process, a different device such as a transfer destination router 4 does not need to perform the matching process on any content with the content associated information, which hereby prevents the router 4 and the different routers or other devices from performing the matching process redundantly on a same content.

For example, regarding location information, in cases where a broad area is specified in the interest and only parts of the area are shown in images which are to undergo the matching process, the content associated information included in the interest can be utilized to avoid other routers from performing the matching process on camera images showing the same area. For example, regarding time information, in cases where a wide time range is specified in the interest and camera images to undergo the matching process with shooting times within only a part of the specified time range, the content associated information included in the interest can be utilized to avoid the router from performing the matching process on camera images with shooting times in the same time range, while performing the matching process on only camera images with other shooting times.

In the present embodiment, the router is configured such that, when a content (camera image) in which a search target person is shown is found, the router transmits the content to a content request source. However, the router may be configured to transmit a matching success notification to a content request source, the matching success notification indicating that a content in which a search target person is shown is found. In this case, by adding content attribute information (such as location information or time information) to the matching success notification, a user is allowed to grasp a current state of the search target person.

In the present embodiment, the router is configured such that, when no content (camera image) in which a search target person is shown is found, the router transmits a matching failure notification to a content request source. However, the router may be configured such that any particular notification is not transmitted when no such content is found.

Next, an operation procedure of a camera 2 and the server 3 when receiving an interest will be described.

An operation procedure of a camera 2 and the server 3 when receiving an interest is almost the same as that of a router 4 (FIG. 12), but is different from the router in that the operation procedure of these devices does not include the transfer of the received interest.

Specifically, upon receiving an interest, either a camera 2 or the server 3 performs the search process on CS, aiming to find one or more contents (camera images) which meet a specified search criteria set. When one or more contents which meet the search criteria set are present, the device uses a face image added to the interest to perform the matching process for verifying whether or not each of the contents shows a search target person. When a content in which the search target person is shown is found, the device transmits the content to a user terminal 1 of a content request source. When no content in which the search target person is shown is found, the device transmits a matching failure notification to a user terminal 1 of a content request source.

As described above, in the present embodiment, in order to conduct a person search, an interest with a face image of a specific search target person is transmitted to be used to collect contents (camera images) from routers 4, cameras 2, and the server 3 to thereby find the search target person. This person search technique can be utilized to find various types of persons.

For example, this person search technique can be applied to a search for a lost child. Consider a case where a child is lost in a facility such as a department store and the lost child may appear in images of cameras 2 installed in the facility. In this case, by using contents (camera images) collected from the cameras 2, it is possible to determine a likely location of the lost child and estimate a likely movement path along with the lost child has moved.

Moreover, this person search technique can be applied to a search for a family member in a disaster-struck area. Consider a case where people in such a disaster-struck area walk along roads or sidewalks to evacuate to an evacuation shelter and cameras 2 for surveillance of roads or shelters can capture those people in the disaster-struck area. In this case, by using contents (camera images) collected from the cameras 2, it is possible to determine which evacuation shelter a disaster victim has evacuated to (likely evacuation site), and which path along the disaster victim has evacuated (likely evacuation path).

This person search technique can also be applied to a search for a criminal. Consider a case where a criminal on the lam moves along roads from a scene of a crime and surveillance cameras 2 for roads can capture the criminal. In this case, by using contents (camera images) collected from the cameras 2, it is possible to determine which route the escaped criminal has been followed (likely escaping route).

Variation of First Embodiment

Next, a variation of the first embodiment of the present invention will be described. Except for what will be discussed here, this embodiment is the same as the above-described embodiment.

In the first embodiment, when a router 4, a camera 2, or the server 3 holds contents (camera images) which meet a search criteria set, such contents undergo the matching process performed by the device holding the contents. However, in this variation, even when one or more contents which meet a search criteria set are present in a device, if a predetermined condition is met, the device does not perform the matching process on the contents, but requests a different nearby device to perform the matching process on the contents.

More specifically, in this variation, when a device does not perform the matching process, the device transmits the contents along with an interest to a different device. Upon receiving the contents and the interest, the different device performs the matching process on the contents. This configuration enables a different device to perform the matching process on contents which meet the search criteria set even when the different device does not hold the contents.

A matching process request destination may be unspecified; that is, it is possible not to specify a different device to which the device transmits a request to perform the matching process. The matching process request destination may be a specific device such as a user terminal of a content request source. In this case, a device transmits contents which meet a search criteria set along with an interest to the user terminal 1 of the content request source, where the matching process is performed on the received contents.

Figure 13:
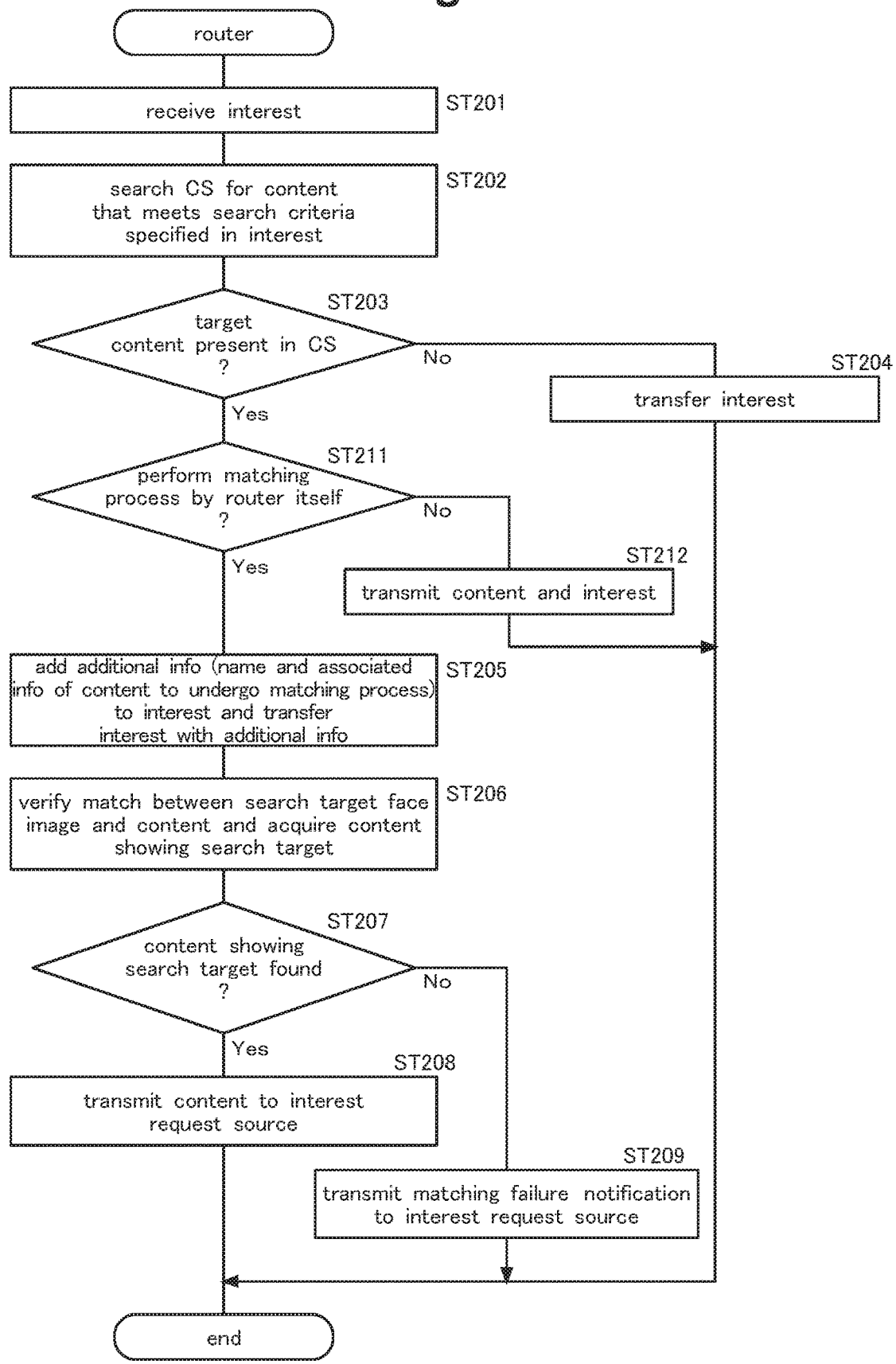
FIG. 13 is a flow chart showing an operation procedure of a router 4 when receiving an interest according to a variation of the first embodiment.

Next, an operation procedure of a router 4 when receiving an interest according to the variation of the first embodiment will be described. FIG. 13 is a flow chart showing an operation procedure of the router 4 when receiving an interest according to a variation of the first embodiment.

In this variation, the router 4 receives an interest (ST201) and performs a search process, aiming to find one or more contents (ST202) in the same manner as the first embodiment (FIG. 12).

When a search result shows that one or more contents which meet the search criteria set are present in CS (Yes in Step ST203), the router 4 determines whether or not the router 4 performs the matching process (ST211). When the router does not perform the matching process (No in Step ST211), the router transmits the contents, which meet the search criteria set; that is, which are to undergo the matching process, along with an interest to a different device (e.g., a user terminal 1 of a content request source) (ST212).

When the router performs the matching process (Yes in Step ST211), the router adds additional information to an interest, and transfers the interest to a different device, where the additional information includes a content name and content associated information of the content which meets the search criteria set; that is, which is to undergo the matching process (ST205). The subsequent steps are the same as in the first embodiment (see FIG. 12). Also, the interest transfer (ST204) which is performed when no content which meets the search criteria set is present in CS (No in ST203) is the same as in the first embodiment.

Next, a method to determine whether or not a router performs the matching process in ST211 will be described.

First, the router determines whether or not the device performs the matching process based on a processing load of the controller (processor) of the device. Specifically, the router measures a processing load of the controller 42 of the device, and when the processing load is larger than a predetermined reference value, the router does not perform the matching process. The router 4 may compare the processing load of the device with those of different devices, and if the router finds a different device having a smaller processing load than the router, the router 4 entrusts the matching process to the different device.

The router 4 may be configured to determine whether or not to the device performs the matching process based on how many contents are waiting to undergo the matching process by the device. Specifically, when the router 4 receives multiple interests, the device performs the matching process in the order of reception, and if the device receives a new interest before the matching process on a current content is not completed, the new interest is waiting to undergo the matching process. If the number of contents waiting to undergo the matching process (the number of matching process waiting contents) is equal to or greater than a predetermined number, the router 4 does not perform the matching process on those contents. The router 4 may compare the number of contents waiting to undergo the matching process with those of different devices, and if the router finds a different device in which the smaller number of contents waiting to undergo the matching process than that of the router, the router 4 entrusts the matching process to the found device.

The router 4 may be configured to determine whether or not the device performs the matching process based on a capability of the device compared to those of different devices. Specifically, the router 4 compares a capacity of the device with those of different devices, and if the router finds a device having a more capacity than the router, the router 4 entrusts the matching process to the found device.

In some cases, the router 4 may be configured to share the processing load of the matching process with a different device. For example, when the router 4 finds four contents which meet the search criteria set, the router may perform the matching process on two contents, and transmit the two remaining contents to the different device and entrusts the matching process thereon to the different device.

In cases where the router 4 compares the capacity, the processing load or the number of contents waiting to undergo the matching process of the router with that of a different device, when transmitting an interest or content, the router preferably adds information on the processing load or the number of waiting contents to the interest and or content so as to notify nearby different devices of the information so that the router 4 and the nearby different devices can share the information on the processing load or the number of waiting contents. In some cases, the router and its nearby devices may regularly exchange messages with each other in order to share such information. It should be noted that information on a capacity of a device may be the presence or absence of GPU (Graphics Processing Unit), which can perform the matching process at high speed. When the processing load or the number of waiting contents is used, it is preferable that latest information on the processing load or the number of waiting contents should be exchanged between the nearby devices.

Second Embodiment

Figure 14:
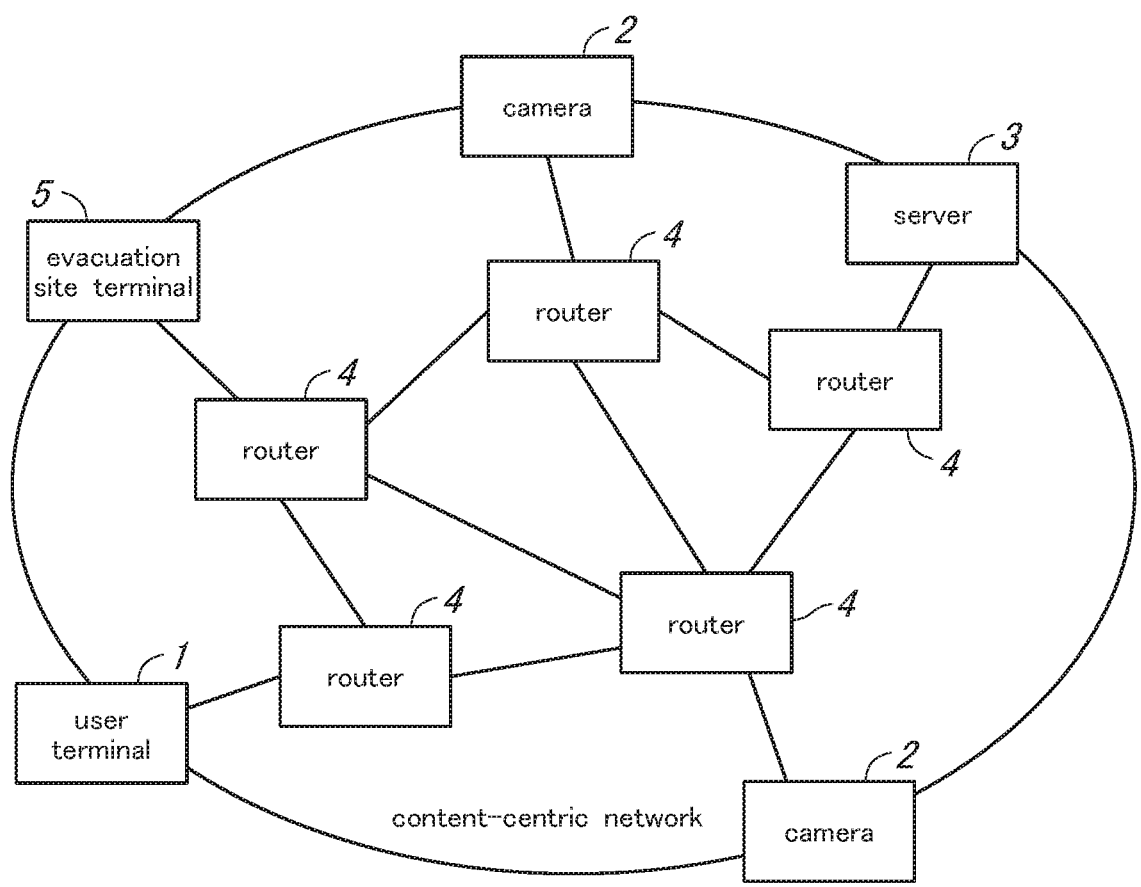
FIG. 14 is a diagram showing a general configuration of a communication system according to a second embodiment of the present invention.

Next, a second embodiment of the present invention will be described. Except for what will be discussed here, this embodiment is the same as the above-described embodiment. FIG. 14 is a diagram showing a general configuration of a communication system according to the second embodiment of the present invention.

In the first embodiment, contents (camera images) showing a search target person are collected based on a face image (image information) of the search target person. However, in this embodiment, contents (such as evacuees' safety list) showing a search target person are collected based on a name of the evacuees' safety list (search target ID information, character information). A content to be collected (evacuees' safety list) includes information on Name of shelter (evacuation place), Name of evacuee, and Health state or degree of injury. Thus, a user (searcher) can grasp an evacuation place in which a search target person is present and confirm the person's safety by obtaining such a content (evacuees' safety list).

A communication system according to the present embodiment includes a user terminal 1, multiple shelter terminals 5 (communication devices, content accumulation devices), a server 3, and routers 4.

The user terminal 1 is operated by a user (searcher), each shelter terminal 5 is installed in corresponding shelter and creates content (evacuees' safety list), and regularly transmits contents to the server 3. The server 3 is configured to manage the status of evacuees at respective shelters, and hold contents (evacuees' safety list) transmitted from the respective shelters. Each router 4 is configured to relays a content transmitted from the shelter terminals 5 to the server 3, and a routers 4 located on a transmission path between a shelter terminal 5 and the server 3 can hold contents transmitted from the shelter terminal 5 as a transmission source.

The user terminal 1 of a content request source, in which a user can input a search criteria set and a name of a search target person (a person who is a target of search), adds the search criteria set and the name of the search target person to an interest, and the user terminal 1 transmits the interest to the network.

Upon receiving the interest, a router 4, a shelter terminal 5, or the server 3 performs a search process on contents in the device, aiming to find one or more contents which meet the search criteria set (evacuees' safety list) specified by the interest, and then, by using a person's name (search target ID information) added to the interest, performs the matching process on the found contents to acquire a content (evacuees' safety list) including the search target person, and transmit the content to a user terminal of a content request source (a transmission source of the interest).

The shelter terminal 5, which is not provided with an imager 21 in the camera 2 (see FIG. 3), includes an input and a display used to create an evacuees' safety list.

Next, configurations of a content name according to the second embodiment will be described. FIG. 15 is an explanatory diagram showing examples of configurations of the content name according to the second embodiment.

In the examples shown in FIG. 15, a content name includes characters representing contents (type) of a content and search criteria information (such as location information and time information).

In an example shown in FIG. 15A, a content name includes only characters ("evacuees' safety list") representing contents (type) of a content.

In an example shown in FIG. 15B, a content name includes a name of a place as location information, in addition to characters ("evacuees' safety list") representing contents (type) of a content.

In an example shown in FIG. 15C, a content name includes update time of the content as time information in addition to characters ("evacuees' safety list") representing contents (type) of a content and location information. Since the number of evacuees gradually increases at an evacuation shelter, an old evacuees' safety list sometimes fails to include a search target person. In this case, a newer update time is specified so as to transmit a newer evacuee safety list.

Next, configuration of Int Assocd information according to the second embodiment will be described. FIG. 16 is an explanatory diagram showing examples of Int Assocd information according to the second embodiment.

In the examples shown in FIG. 15, a content name includes search criteria information (such as location information and time information), whereas, in the examples shown in FIG. 16, search criteria information (such as location information and time information) is included in Int Assocd information.

In all the examples shown in FIG. 16, characters (for example, "evacuees' safety list") representing contents (type) of a content are included in Int Assocd information. However, characters representing contents (type) of a content may be included in a content name.

In an example shown in FIG. 16A, Int Assocd information includes a name of a search target person as search target ID information.

In an example shown in FIG. 16B, Int Assocd information includes a name of place as location information. In this case, since Int Assocd information does not include a name of a search target person, the content (evacuees' safety list) does not undergo the matching process for verifying whether or not the content (evacuees' safety list) includes the person's name.

In an example shown in FIG. 16C, Int Assocd information includes a name of place and location information including a name of place.

In an example shown in FIG. 16D, Int Assocd information includes attributes of a person (gender, age, appearance) in place of a name of a search target person and a name of place. When only the person's name is specified, contents to be transmitted cannot differentiate the search target person from a person having the same first and last names as the search target person. However, specifying person's attributes can narrow down contents to be transmitted. In addition, since names of evacuees who are present in a shelter are sometimes not included in an evacuees' safety list because of some evacuees who can remain unconscious and infant children who cannot tell their names, it is also possible to specify only person's attributes without specifying any person's name.

In an example shown in FIG. 16E, Int Assocd information includes update time of the list in addition to a name of a search target person and a name of place. Using this configuration can narrow down contents to be transmitted to be new contents.

Next, an operation procedure of a router 4 when receiving an interest according to the second embodiment will be described. FIG. 17 is a flow chart showing an operation procedure of the router 4 when receiving an interest.

First, in a router 4, an interface (e.g., interface 0) of the communicator 41 of the router 4 receives an interest (ST301). Then, the search processor 45 performs a search process on CS in the storage 43, aiming to find one or more contents (evacuees' safety lists) which meet a search criteria set specified by the interest, the search criteria set (for example, "evacuees' safety list") being included in a content name or Int Assocd information of the interest (ST302). In the search process, the search may be made either for an exact match or a partial match.

It should be noted that the router does not need to perform the search process in ST302 on contents which is to undergo the matching process in a different router 4 or another device. In this case, since the search criteria set includes content associated information associated with the contents which are to undergo the matching process in the different router 4, the router can complete the matching process without performing the search process on contents with the contact associated information.

When no content which meets the search criteria set is stored in CS (No in Step ST303), the interest transfer controller 47 determines, referring to FIB in the storage 43, an interest transfer destination such as an adjacent router 4 or the server 3, and then transfers the interest from an interface for the interest transfer destination (e.g., interface 1) (ST304). Concurrently, the router 4 stores an interface (e.g., interface 0) for an interest transmission source in the storage 43.

When a content which meets the search criteria set is present in CS (Yes in ST303), the interest transfer controller 47 adds a content name the content which meets the search criteria set (and thus which is to undergo the matching process) along with content associated information (such as location information and time information) to the interest and transfers the interest with the content name and other information to an interest transfer destination (ST305).

Next, the matching processor 46 uses the name of the search target person added to the interest to verify whether or not the search target person is shown in the content (evacuees' safety list) (ST306).

When it is known from a result of the matching process that content which shows the name of the search target person is found (Yes in ST307), the content is transmitted from an interface for a content request source (e.g., interface 0) (ST308).

When no content which includes the name of the search target person is found (No in ST307), the notification controller 48 transmits a matching failure notification from an interface for a content request source (e.g., interface 0), where the notification notifies that one or more contents which meet the search criteria set are present but no content showing the name of the search target person is found (ST309).

In the present embodiment, when a content (evacuees' safety list) showing a name of a search target person is found, the found content is transmitted to a content request source. However, the router may be configured such that, when a content showing a name of a search target person is found, the router extracts a part of the content regarding the search target person, and then transmits only that part to a content request source. This configuration allows for the protection of privacy of persons other than the search target person.

Although, in the present embodiment, when a content showing a name of a search target person is not found, the router transmits a matching failure notification to a content request source. However, the router may be configured such that, when such a content is not found, the router does not transmit any particular notification to a content request source.

Next, an operation procedure of a user terminal 1 according to the second embodiment (not shown) will be described.

First, the user terminal 1 acquires a name and search criteria information (location information, time information, and other information) of a search target person which is specified by a user. Next, the user terminal 1 generates an interest with a content name (such as "evacuees' safety list") which contains the name and search criteria information of the search target person, in addition to Int Assocd information, and transmits the generated interest to the content-centric network.

When receiving a content (evacuees' safety list) for the transmitted interest, the user terminal 1 displays the received content on a display 15 so as to present it to the user. Then, when the user (searcher) confirms that the content shows a name of a search target person, the user can grasp in which shelter the search target person is present. Furthermore, when the content also shows the health state or degree of injury of the person, the user can grasp the status of the search target person.

The user terminal 1 can receive multiple different contents (evacuees' safety lists). For example, when only a name of a person is added as information which specifies a person to an interest and the interest is transmitted, the user terminal 1 sometimes receives a content specifying a person with the same first and last names. In this case, when the content further including information on attributes of a person, the user can decide whether or not the content is regarding a search target person and grasp in which shelter the search target person is present. Furthermore, the user terminal 1 can receive multiple different contents when the search target person moves to a different shelter. In this case, the user can grasp information on the latest shelter in which the person stays based on the update times of the contents.

When the user terminal 1 receives no content corresponding to the transmitted interest within a predetermined time, the user terminal causes the user to change a search criteria set (location information and time information), and transmits the interest again. Similarly, when receiving a matching failure notification notifying that one or more contents (evacuees' safety lists) which meet a search criteria set specified by the interest are present, but no content includes a name of the search target person, the user terminal encourages the user to change a search criteria set and transmits the interest again.

Next, an operation procedure of a shelter terminal 5 and the server 3 when receiving an interest (not shown) will be described.

An operation procedure of a shelter terminal 5 and the server 3 when receiving an interest is almost the same as that of a router 4 (FIG. 17), but is different from the router in that the operation procedure of these devices does not include the transfer of the received interest.

Specifically, upon receiving an interest, either a shelter terminal 5 or the server 3 performs a search process on CS, aiming to find one or more contents (evacuees' safety lists) which meet a specified search criteria set. When one or more contents which meet the search criteria set are present, the device performs, by using a person's name added to the interest, the matching process for verifying whether or not each content shows a search target person. When a content showing the search target person is found, the device transmits the content to a user terminal 1 of a content request source. When no content showing the search target person is found, the device transmits a matching failure notification to a user terminal 1 of a content request source.

Variation of Second Embodiment

Next, a variation of the second embodiment of the present invention will be described. Except for what will be discussed here, this embodiment is the same as the above-described embodiment.

In the variation of the second embodiment, even when a router 4, a camera 2, or the server 3 holds contents which meet a search criteria set, if a predetermined condition is met, the device does not perform the matching process on the contents, but requests a different nearby device to perform the matching process on the contents in the same manner as the variation of the first embodiment.

Next, an operation procedure of a router 4 when receiving an interest according to the variation of the second embodiment will be described. FIG. 18 is a flow chart showing an operation procedure of the router 4 when receiving an interest according to the variation of the second embodiment.

In this variation, the router 4 receives an interest (ST301) and performs a search process, aiming to find one or more contents (ST302) in the same manner as the second embodiment (FIG. 17).

When a search result shows that one or more contents which meet the search criteria set are present in CS (Yes in Step ST303), the router 4 determines whether or not the router 4 performs the matching process (ST311). When the router does not perform the matching process (No in Step ST311), the router transmits the contents which meet the search criteria set and which is to undergo the matching process, along with an interest to a different device (e.g., a user terminal 1 of a content request source) (ST312).

When the router determines to perform the matching process (Yes in Step ST311), the router adds additional information to an interest, and transfers the interest to a different device, where the additional information includes a content name of one or more contents which meet the search criteria set; that is, which are to undergo the matching process (ST305). The subsequent steps are the same as in the second embodiment (see FIG. 17). Also, the interest transfer (ST304) is performed when no content which meets the search criteria set is present in CS (No in ST303) in the same manner as the second embodiment.

Third Embodiment

Next, a third embodiment of the present invention will be described. Except for what will be discussed here, this embodiment is the same as the above-described embodiments.

In the above-described embodiments, search target ID information (a face image or a name of a person) for identifying a search target person or search criteria information (location information and time information are added to an interest and the interest is transmitted. In the third embodiment, various types of information other than search target ID information and search criteria information are added as Int Assocd information to an interest, and the interest is transmitted.

Next Int Assocd information according to the third embodiment will be described. FIG. 19 is an explanatory diagram showing examples of Int Assocd information according to the third embodiment.

In examples of FIGS. 19A and 19B, Int Assocd information includes, in addition to location information and time information, various types of information such as search criteria set, matching criteria, contents (camera images), image file format, and much result notification method, and other information.

An item of content name search method designates a search criteria set for the search process using a content name (exact match, partial match).

An item of matching process designates various matching criteria including: face image matching in which a face image is used to determine whether or not a person is the same as a search target person; voice matching in which voice data is used to determine whether or not a person is the same as a search target person; and clothing matching in which an image of clothing is used to determine whether or not a person is the same as a search target person. In this way, additional use of matching processes other than face image matching can increase the matching accuracy of the matching process.

Other possible processes include belonging matching, in which images of belongings such as a bag (or other belongings) are used to determine whether or not a person is the same as a search target person. When performing a voice data matching process, a camera 2 needs to be provided with voice recording functionality. Moreover, when performing a voice data matching process, a voice data of a search target person is added to an interest. When performing a clothing matching processor a belonging matching process, image data of clothing or belongings is added to an interest.

An item of matching criteria designates a threshold level (50% or more, 80% or more, or 90% or more) of similarity used in determining whether or not a person is the same as a search target person.

An item of image data format designates a format of an image in a content (jpg, gif, png).

An item of match result notification method designates whether or not a matching failure notification is transmitted when no content showing a search target person is found (ignore match process NG, notify match process NG). This item can designate a method in which, instead of transmitting a content showing a search target person, only a matching success notification is transmitted to notify the fact that a content showing a search target person is found (notify a matching success result only).

In addition, the item of match result notification method can designate whether or not to perform a matching method described above concerning the variations of the first and second embodiments ("transfer interest"), in which one or more contents which meet a search criteria set specified by an interest are transferred to a different device and the different device is requested to perform the matching process on the contents.

In an example of FIG. 19C, the item of matching process designates a threshold level of similarity used in determining whether or not a person is the same as a search target person; and the item of matching process designates a matching method (such as face image matching, clothing matching, or matching using belongings) in the same manner as FIGS. 19A and 19B.

The example of FIG. 19C also includes odor data matching in which odor data is used to determine whether or not a person is the same as a search target person, pet matching in which pet images are used to determine whether or not a pet is the same as a search target pet (animal), and lost article image matching in which lost article images are used to determine whether or not an article is a search target lost article.

When performing an odor data matching process, odor data at a search target place is added to an interest. When performing a pet image data matching process, an image of a search target pet is added to an interest. When performing a lost article image matching process, an image of a lost article is added to an interest.

In the example of FIG. 19C, the item of attribute data designate data of attributes of a search target person such as sex, age, and height. In this case, attribute estimation processes are performed to estimate attributes (gender estimation, age estimation, and height estimation) of a person shown in a content (camera image), and the results of estimations are used to determine whether or not a person is the same as a search target person. This matching process based on results of estimations can be used in combination with a face image matching process as appropriate. When performing a matching process based on attributes, attributes of a search target person are added to an interest.

In the example of FIG. 19C, an item designates whether or not to encrypt a content (camera image) when transmitting the content. When a content is encrypted, only a user terminal 1 of a content request source can decrypt and display the content, which allows for the protection of privacy of a person. In this case, the system is configured, for example, such that a public key corresponding to a secret key held by the user terminal 1 is added to an interest so that the user terminal 1 transmits the interest with the public key, and that routers 4, cameras 2, and the server 3 are configured to encrypt a content by using the received public key and transmits the content to the network.

Furthermore, in the example of FIG. 19C, an item designates whether or not to encrypt a face image to be added to an interest. By encrypting a face image, privacy of a person can be protected. In this case, a key used to decode an encrypted face image is distributed in advance to routers 4, cameras 2, and the server 3. The user terminal 1 encrypts an face image and adds the encrypted face image to an interest and transmits the interest with the encrypted face image to the network. The routers 4, the cameras 2, and the server 3 are configured to decode the face image in the received interest by using the distributed key, and performs the matching process on the decoded face image. In another possible configuration, the user terminal 1 acquires a public key of a router 4, a camera 2, or a server 3. The user terminal 1 encrypts a face image by using the public key and adds the encrypted face image to an interest, and transmits the interest with the encrypted face image to a network.

While specific embodiments of the present invention are described herein for illustrative purposes, the present invention is not limited thereto. It will be understood that various changes, substitutions, additions, and omissions may be made for elements of the embodiments without departing from the scope of the invention. In addition, elements and features of the different embodiments may be combined with each other as appropriate to yield an embodiment which is within the scope of the present invention.

For example, systems according to the above-described embodiments are configured to include routers, cameras, and a server, and these devices are configured to transmit contents corresponding to an interest. However, a system may further include a database, what is called an RN (rendezvous node), configured to manage content holding devices (such as a server), which hold contents (such as camera images) transmitted from cameras or other devices, by associating the devices with content names, whereby a user terminal can make a query to the RN so that the terminal device is notified of a device which holds a content.

INDUSTRIAL APPLICABILITY

A communication device, a communication system, and a content correction method according to the present invention achieve an effect of making it possible, by performing a matching process on contents using search target ID information identifying a search target, to properly acquire a content regarding the search target and to shorten a time required to complete the matching process so that a user can acquire a desired content more quickly, and are useful as a communication device connected to a content-centric network, a communication system including a communication device and a content accumulating device, the devices being connected to a content-centric network, and a content correction method for causing a communication device to collect a content regarding a search target from a content accumulator via a content-centric network.

Glossary 1 user terminal (communication device)
2 camera (communication device, content accumulating device)
3 server (communication device, content accumulating device)
4 router (communication device, content accumulating device)
5 shelter terminal (communication device, content accumulating device)
11 communicator
12 controller
13 storage
22 communicator
23 controller
24 storage
31 communicator
32 controller
33 storage
41 communicator
42 controller
43 storage

The invention claimed is:

1. A communication device connected to a content-centric network, the communication device comprising:
a storage for accumulating contents, wherein the communication device collects a content to be searched from at least one or more content accumulating devices among a plurality of content accumulating devices connected to the content-centered network via a plurality of other communication devices connected to the content-centered network;
a receiver for receiving an interest to which search criteria set information including a search criteria set and search target ID information are added, the search target ID information identifying a search target and being an image of the search target;
a transmitter for transmitting the content to a communication device of a content request source; and
a controller configured to perform:
a search process on the contents accumulated in the storage, aiming to find one or more contents which meet the search criteria set; and
a matching process for verifying whether an image of the content found in the search process matches the image of the search target added to the interest to acquire a content including the image of the search target,
wherein the controller is configured to, if the content including the image of the search target is acquired, cause the transmitter to transmit the content to the communication device of the content request source, otherwise cause the transmitter to transfer the interest received by the receiver to a different communication device.

2. The communication device according to claim 1, wherein the receiver receives the interest including a content name of the content and interest associated information, wherein the search criteria set information including a search criteria set regarding a time and a location of the content and the search target ID information are added to either of the content name of the content or the interest associated information, and
wherein the controller performs the search process based on the search criteria set information.

3. The communication device according to claim 1, wherein the receiver receives the interest which includes an image of a search target person as the search target ID information, and
wherein the controller performs the matching process by using the image of the search target person to acquire the content including the image of the search target person.

4. The communication device according to claim 1, wherein the receiver receives the interest which includes, as the search target ID information, a name of a search target person, and wherein the controller performs the matching process by using the name of the search target person to acquire the content including the name of the search target person.

5. The communication device according to claim 1, wherein the receiver receives the interest to which matching criteria information is added, the matching criteria information identifying a criteria set used in the matching process, and
wherein the controller performs the matching process based on the matching criteria information.

6. The communication device according to claim 1, wherein the receiver receives the interest to which matching result notification information is added, the matching result notification information identifying a method of transmitting a notification of a result of the matching process, and
wherein the controller, based on the matching result notification information, transmits the notification of the result of the matching process to the content request source.

7. The communication device according to claim 1, wherein at least one of the plurality of content accumulating devices is a security camera.

8. A communication device connected to a content-centric network, the communication device comprising:
a storage for accumulating contents, wherein the communication device collects a content to be searched from at least one or more content accumulating devices among a plurality of content accumulating devices connected to the content-centered network via a plurality of other communication devices connected to the content-centered network;
a receiver for receiving an interest to which search criteria set information including a search criteria set and search target ID information are added, the search target ID information identifying a search target;
a controller configured to perform:
  a search process on the contents accumulated in the storage, aiming to find one or more contents which meet the search criteria set; and
  a matching process for verifying whether the content found in the search process matches the search target ID information to acquire a content regarding the search target; and
a transmitter for transmitting the content regarding the search target to a communication deice of a content request source,
wherein, in a case where the storage stores the content which meets the search criteria set and the controller performs the matching process on the content, the controller adds content associated information associated with the content to the interest, and then causes the transmitter to transmit the content to a different communication device.

9. A communication device connected to a content-centric network, the communication device comprising:
a storage for accumulating contents, wherein the communication device collects a content to be searched from at least one or more content accumulating devices among a plurality of content accumulating devices connected to the content-centered network via a plurality of other communication devices connected to the content-centered network;
a receiver for receiving an interest to which search criteria set information including a search criteria set and search target ID information are added, the search target ID information identifying a search target;
a controller configured to perform:
  a search process on the contents accumulated in the storage, aiming to find one or more contents which meet the search criteria set; and
  a matching process for verifying whether the content found in the search process matches the search target added to the interest to acquire a content regarding the search target; and
a transmitter for transmitting the content regarding the search target to a communication device of a content request source,
wherein, even in a case where the storage stores the content which meets the search criteria set, the controller does not perform the matching process on the content, but causes the transmitter to transmit the content along with the interest to a different communication device.

10. The communication device according to claim 9, wherein the controller determines whether or not the controller performs the matching process on the content stored in the storage based on at least one of a processing load of the controller, how many content(s) is/are waiting to undergo the matching process, and a capability of the controller.

11. A communication device connected to a content-centric network, the communication device comprising:
a storage for accumulating contents, wherein the communication device collects a content to be selected from at least one or more content accumulating devices among a plurality of content accumulating devices connected to the content-centric network via a plurality of other communication devices connected to the content-centric network;
a controller configured to generate an interest to which search criteria set information including a search criteria set and search target ID information are added, the search target ID information identifying a search target and being an image of the search target;
a transmitter for transmitting the interest to the content-centric network; and
a receiver configured to communicate with a different communication device connected to the content-centric network, wherein the different communication device performs a search process on contents stored in the different communication device, aiming to find one or more contents which meet the search criteria set, and a matching process for verifying whether an image of the content found in the search process matches the image of the search target added to the interest to acquire a content including the image of the search target, and wherein the receiver receives the acquired content including the image of the search target from the different communication device.

12. A communication system including a plurality of communication devices and a plurality of content accumulating devices, the devices being connected to a content-centric network,
wherein one of the communication devices comprises:
a controller configured to generate an interest to which search criteria set information including a search criteria set and search target ID information are added, the search target ID information identifying a search target and being an image of the search target;
a transmitter for transmitting the interest to the content-centric network; and
a receiver for receiving a content including the image of the search target, wherein one of the content accumulating devices collects a content to be searched from at least one or more content accumulating devices among a plurality of content accumulating devices connected to the content-centered network via a plurality of other communication devices connected to the content-centered network, wherein the one of the content accumulating devices comprises:
- a storage for accumulating contents;
- a receiver for receiving an interest to which the search criteria set information and the search target ID information are added, the search target ID information identifying a search target and being the image of the search target;
- a transmitter for transmitting the content to a communication device of a content request source; and
- a controller configured to perform:
  - a search process on the contents accumulated in the storage, aiming to find one or more contents which meet the search criteria set; and
  - a matching process for verifying whether an image of the content found in the search process matches the image of the search target included in the interest to acquire a content including the image of the search target, and wherein the controller is configure to, if the content including the image of the search target is acquired, cause the transmitter to transmit the content to the communication device of the content request source, otherwise cause the transmitter to transfer the interest received by the receiver to a different communication device.

13. A content collection method for a communication device connected to a content-centric network, the content collection method comprising:
- a content accumulator collecting a content to be searched from at least one or more content accumulating devices among a plurality of content accumulating devices connected to the content-centered network via a plurality of other communication devices connected to the content-centric network;
- the communication device generating an interest to which search criteria set information including a search criteria set and search target ID information are added, the search target ID information identifying a search target and being an image of the search target, and transmitting the interest to the content-centric network;
- the content accumulator, upon receiving the interest including the image of the search target, performing a search process on contents accumulated therein, aiming to find one or more contents which meet the search criteria set, and performing a matching process for verifying whether an image of the content found in the search process matches the image of the search target added to the interest to acquire a content including the image of the search target; wherein if the content including the image of the search target is acquired, the content accumulator transmitting the acquired content to a communication device at a content request source, otherwise transferring the interest received by the receiver to a different communication device; and
- the communication device receiving the content including the image of the search target.

* * * * *